US012595021B2

(12) United States Patent
Nakashima et al.

(10) Patent No.: US 12,595,021 B2
(45) Date of Patent: Apr. 7, 2026

(54) BRAKE DEVICE FOR HUMAN-POWERED VEHICLE

(71) Applicant: Shimano Inc., Sakai (JP)

(72) Inventors: Yasuhiro Nakashima, Sakai (JP); Kiichiro Nagata, Sakai (JP); Hitoshi Takayama, Sakai (JP)

(73) Assignee: Shimano Inc., Osaka (JP)

( * ) Notice: Subject to any disclaimer, the term of this patent is extended or adjusted under 35 U.S.C. 154(b) by 532 days.

(21) Appl. No.: 18/113,900

(22) Filed: Feb. 24, 2023

(65) Prior Publication Data

US 2023/0294790 A1     Sep. 21, 2023

(30) Foreign Application Priority Data

Mar. 15, 2022    (JP) ................................. 2022-040463

(51) Int. Cl.
| | |
|---|---|
| *B62L 3/00* | (2006.01) |
| *B62L 1/00* | (2006.01) |
| *F16D 65/18* | (2006.01) |
| *F16D 55/226* | (2006.01) |
| *F16D 121/24* | (2012.01) |
| *F16D 125/40* | (2012.01) |
| *F16D 125/46* | (2012.01) |

(52) U.S. Cl.
CPC ................. *B62L 3/00* (2013.01); *B62L 1/005* (2013.01); *F16D 65/18* (2013.01); *F16D 55/226* (2013.01); *F16D 2121/24* (2013.01); *F16D 2125/40* (2013.01); *F16D 2125/46* (2013.01)

(58) Field of Classification Search
CPC ..... F16D 65/18–186; F16D 55/22–228; F16D 2121/24; F16D 2125/36; F16D 2125/40; F16D 2125/46; F16D 2125/48; F16D 2127/005; B60T 13/74–748; B62L 3/00; B62L 1/005

See application file for complete search history.

(56) References Cited

U.S. PATENT DOCUMENTS

| | | | |
|---|---|---|---|
| 2010/0163351 A1* | 7/2010 | Sakashita ................ | F16D 65/18 |
| | | | 188/182 |
| 2018/0304961 A1 | 10/2018 | Shimoda et al. | |
| 2019/0322265 A1* | 10/2019 | Tsukamoto ........... | B60T 17/221 |

FOREIGN PATENT DOCUMENTS

| | | |
|---|---|---|
| DE | 693 29 586 T2 | 3/2001 |
| DE | 10 2016 107 655 A1 | 11/2016 |
| DE | 10 2019 100 723 A1 | 8/2019 |
| JP | H07301291 A  * | 11/1995 |
| JP | 8-510316 A | 10/1996 |
| JP | 9-207867 A | 8/1997 |
| JP | 2004-44778 A | 2/2004 |
| JP | 2016-203932 A | 12/2016 |
| JP | 2020-82868 A | 6/2020 |
| JP | 2020-131717 A | 8/2020 |

* cited by examiner

*Primary Examiner* — David R Morris
(74) *Attorney, Agent, or Firm* — Spencer Fane, LLP

(57) ABSTRACT

A brake device for a human-powered vehicle includes an input body, a brake, and a power converter. A driving force is input to the input body. The brake is configured to contact a rotational body of the human-powered vehicle. The power converter is configured to convert a rotational force of the input body to a force that moves the brake toward the rotational body. The power converter includes a transmission configured to change a ratio of a movement amount of the brake to an output rotational speed of the input body.

21 Claims, 11 Drawing Sheets

BRAKE DEVICE FOR HUMAN-POWERED VEHICLE

CROSS-REFERENCE TO RELATED APPLICATIONS

This application claims priority to Japanese Patent Application No. 2022-040463, filed on Mar. 15, 2020. The entire disclosure of Japanese Patent Application No. 2022-040463 is hereby incorporated herein by reference.

BACKGROUND

Technical Field

The present disclosure generally relates to a brake device for a human-powered vehicle.

Background Information

Japanese Laid-Open Patent Publication No. 2016-203932 (Patent Document 1) discloses an example of a brake device for a human-powered vehicle including a brake that applies a braking force to a wheel of the human-powered vehicle.

SUMMARY

An objective of the present disclosure is to provide a brake device for a human-powered vehicle that actuates a brake in a preferred manner.

A brake device in accordance with a first aspect of the present disclosure is for a human-powered vehicle. The brake device comprises an input body, a brake, and a power converter. A driving force is input to the input body. The brake is configured to contact a rotational body of the human-powered vehicle. The power converter is configured to convert a rotational force of the input body to a force that moves the brake toward the rotational body. The power converter includes a transmission configured to change a ratio of a movement amount of the brake to an output rotational speed of the input body. With the brake device according to the first aspect, the transmission changes the ratio so that the brake is moved at a preferred ratio. Thus, the brake device actuates the brake in a preferred manner.

In accordance with a second aspect of the present disclosure, the brake device according to the first aspect is configured so that the transmission is configured to change the ratio between a first ratio and a second ratio that differs from the first ratio. With the brake device according to the second aspect, the transmission changes the ratio between the first ratio and the second ratio that differs from that first ratio. Thus, the brake is actuated either at the first ratio or the second ratio.

In accordance with a third aspect of the present disclosure, the brake device according to the second aspect is configured so that the transmission is configured to set the ratio to the first ratio in a case where the brake is moved toward the rotational body until the brake contacts the rotational body and set the ratio to the second ratio as the brake comes into contact with the rotational body. The brake device according to the third aspect actuates the brake at a preferred ratio until the brake contacts the rotational body and in a state in which the brake is in contact with the rotational body.

A brake device in accordance with a fourth aspect of the present disclosure is for a human-powered vehicle. The brake device comprises an input body, a brake, and a power converter. A driving force is input to the input body. The brake is configured to contact a rotational body of the human-powered vehicle. The power converter is configured to convert a force of the input body to a force that moves the brake toward the rotational body. The power converter includes a transmission configured to change a ratio of a movement amount of the brake to an output amount of the input body. The transmission is configured to set the ratio to a first ratio in a case where the brake is moved toward the rotational body until the brake contacts the rotational body. The transmission is configured to set the ratio to a second ratio that differs from the first ratio as the brake comes into contact with the rotational body. The brake device according to the fourth aspect actuates the brake at a preferred ratio until the brake contacts the rotational body and in a state in which the brake is in contact with the rotational body. Thus, the brake device actuates the brake in a preferred manner.

In accordance with a fifth aspect of the present disclosure, the brake device according to any one of the second to fourth aspects is configured so that the transmission is configured to change the ratio from the first ratio to the second ratio in accordance with a reaction force produced as the brake comes into contact with the rotational body in a case where the brake is moved toward the rotational body. The brake device according to the fifth aspect changes the ratio from the first ratio to the second ratio in accordance with the reaction force produced as the brake comes into contact with the rotational body. Thus, the brake device can change the ratio from the first ratio to the second ratio in a case where the brake contacts the rotational body without using a sensor or the like that detects a contact state between the brake and the rotational body.

In accordance with a sixth aspect of the present disclosure, the brake device according to any one of the second to fifth aspects is configured so that the transmission is configured to set the ratio to the second ratio in a state in which the brake is in contact with the rotational body in a case where the brake is moved away from the rotational body. Further, the transmission is configured to set the ratio to the first ratio as the brake separates from the rotational body. The brake device according to the sixth aspect is configured to set the ratio to the second ratio in a state in which the brake is in contact with the rotational body and set the ratio to the first ratio as the brake separates from the rotational body. This changes the ratio from the second ratio to the first ratio in accordance with the contact state between the brake and the rotational body.

In accordance with a seventh aspect of the present disclosure, the brake device according to any one of the second to sixth aspects is configured so that the transmission is configured to maintain the ratio at the second ratio with a reaction force applied to the brake by the rotational body in a case where the brake is moved away from the rotational body and the brake is in contact with the rotational body. With the brake device according to the seventh aspect, in a case where the brake is moved away from the rotational body and the brake is in contact with the rotational body, the transmission maintains the ratio at the second ratio with the reaction force applied to the brake by the rotational body.

In accordance with an eighth aspect of the present disclosure, the brake device according to any one of the second to seventh aspects is configured so that the first ratio is greater than the second ratio. With the brake device according to the eighth aspect, the transmission sets the ratio until the brake contacts the rotational body to be greater than that in a state in which the brake is in contact with the rotational body. Thus, the brake device readily brings the brake into contact with the rotational body, and the brake produces a large braking force in a state in contact with the rotational body.

In accordance with a ninth aspect of the present disclosure, the brake device according to any one of the second to eighth aspects is configured so that the transmission is configured to transmit a rotational force of the input body to the brake through one of a first transmission path configured to set the ratio to the first ratio and a second transmission path configured to set the ratio to the second ratio. With the brake device according to the ninth aspect, the transmission selects either the first transmission path or the second transmission path to change the ratio between the first ratio and the second ratio.

In accordance with a tenth aspect of the present disclosure, the brake device according to the ninth aspect is configured so that the input body includes an input rotational shaft, a first input rotational body, and a second input rotational body. The first input rotational body is provided on the input rotational shaft. The second input rotational body is provided on the input rotational shaft and has an outer diameter that differs from that of the first input rotational body. The first input rotational body is configured to transmit a rotational force to the first transmission path. The second input rotational body is configured to transmit a rotational force to the second transmission path. With the brake device according to the tenth aspect, the first transmission path and the second transmission path receive a rotational force transmitted from the input bodies having different outer diameters, respectively.

In accordance with an eleventh aspect of the present disclosure, the brake device according to the tenth aspect further comprises a housing. The power converter includes a first shaft, a first rotational body, a second rotational body, a first converter, and a second converter. The first shaft has a first center axis and that is rotatable relative to the housing. The first rotational body is provided on the first shaft and engaged with the first input rotational body. The second rotational body is provided on the first shaft and engaged with the second input rotational body. The first converter is provided on the first shaft and that converts rotational motion to linear motion. The second converter is provided on the first shaft and that converts rotational motion to linear motion. The first shaft is configured to be movable relative to the first rotational body and the second rotational body in a direction parallel to the first center axis. The brake is provided on an end of the first shaft in the direction parallel to the first center axis. With the brake device according to the eleventh aspect, the power converter converts rotational motion input from the first input rotational body to the first rotational body and rotational motion input from the second input rotational body to the second rotational body into linear motion that moves the brake with respect to the rotational body. With the brake device according to the eleventh aspect, the first converter and the second converter are both provided on the first shaft. Thus, the brake provided on the end of the first shaft in the direction parallel to the first center axis is moved by linear motion produced with the first converter and the second converter.

In accordance with a twelfth aspect of the present disclosure, the brake device according to the eleventh aspect is configured so that the first converter includes a first engagement portion and a second engagement portion. The first engagement portion is provided on the first rotational body at a portion that differs from a portion engaged with the first input rotational body. The second engagement portion is provided on the first shaft in a manner movable relative to the first shaft in the direction parallel to the first center axis and engaged with the first engagement portion. One of the first engagement portion and the second engagement portion includes a female thread. The other one of the first engagement portion and the second engagement portion includes a male thread. With the brake device according to the twelfth aspect, the first engagement portion and the second engagement portion convert rotational motion to linear motion with the female thread and the male thread.

In accordance with a thirteenth aspect of the present disclosure, the brake device according to the twelfth aspect is configured so that the first engagement portion includes the male thread, and the second engagement portion includes the female thread. With the brake device according to the thirteenth aspect, the first converter converts rotational motion to linear motion with the male thread included in the first engagement portion and the female thread included in the second engagement portion.

In accordance with a fourteenth aspect of the present disclosure, the brake device according to the twelfth or thirteenth aspect is configured so that the transmission includes a first restriction mechanism and a second restriction mechanism. The first restriction mechanism is configured to restrict rotation of the second engagement portion relative to the housing. The second restriction mechanism is configured to restrict movement of the second engagement portion relative to the first engagement portion in the direction parallel to the first center axis. With the brake device according to the fourteenth aspect, the first converter converts rotational motion to linear motion with the first restriction mechanism and the second restriction mechanism.

In accordance with a fifteenth aspect of the present disclosure, the brake device according to the fourteenth aspect is configured so that the first restriction mechanism is configured to permit rotation of the second engagement portion relative to the housing in a case where a torque input to the second engagement portion is greater than or equal to a first torque. The first restriction mechanism is configured to restrict rotation of the second engagement portion relative to the housing in a case where the torque input to the second engagement portion is less than the first torque. The second restriction mechanism is configured to restrict movement of the second engagement portion relative to the first engagement portion in the direction parallel to the first center axis in a case where the torque input to the second engagement portion is greater than or equal to a second torque. The second restriction mechanism is configured to permit movement of the second engagement portion relative to the first engagement portion in the direction parallel to the first center axis in a case where the torque input to the second engagement portion is less than the second torque. With the brake device according to the fifteenth aspect, the first restriction mechanism selects between a state in which rotation of the second engagement portion relative to the housing is permitted and a state in which rotation of the second engagement portion relative to the housing is restricted in accordance with the torque input to the second engagement portion. With the brake device according to the fifteenth aspect, the second restriction mechanism selects between a state in which movement of the second engagement portion relative to the first engagement portion in the direction parallel to the first center axis is restricted and a state in which movement of the second engagement portion relative to the first engagement portion in the direction parallel to the first center axis is permitted in accordance with the torque input to the second engagement portion.

In accordance with a sixteenth aspect of the present disclosure, the brake device according to any one of the twelfth to fifteenth aspects is configured so that the second converter includes a third engagement portion and a fourth engagement portion. The third engagement portion is provided on the first shaft in a manner nonrotatable relative to the housing. The fourth engagement portion is provided on the first shaft. The third engagement portion is configured to be moved relative to the first shaft integrally with the second engagement portion in the direction parallel to the first center axis. The fourth engagement portion is configured to be moved relative to the first shaft and the second engagement portion in the direction parallel to the first center axis. With the brake device according to the sixteenth aspect, the second converter converts rotational motion to linear motion with the third engagement portion and the fourth engagement portion.

In accordance with a seventeenth aspect of the present disclosure, the brake device according to sixteenth aspect is configured so that the second rotational body, the first rotational body, the second engagement portion, the third engagement portion, the fourth engagement portion, and the brake are provided on the first shaft in order of the second rotational body, the first rotational body, the second engagement portion, the third engagement portion, the fourth engagement portion, and the brake in the direction parallel to the first center axis. With the brake device according to the seventeenth aspect, the second rotational body, the first rotational body, the second engagement portion, the third engagement portion, the fourth engagement portion, and the brake are provided on the first shaft in order of the second rotational body, the first rotational body, the second engagement portion, the third engagement portion, the fourth engagement portion, and the brake in the direction parallel to the first center axis.

In accordance with an eighteenth aspect of the present disclosure, the brake device according to any one of the first to seventeenth aspects further comprises an electric actuator configured to transmit the driving force to the input body. With the brake device according to the eighteenth aspect, the brake uses the driving force transmitted from the electric actuator to the input body to brake the rotational body.

In accordance with a nineteenth aspect of the present disclosure, the brake device according to the eighteenth aspect further comprises a speed reducer provided between the electric actuator and the input body. With the brake device according to the nineteenth aspect, the speed reducer is provided between the electric actuator and the input body. Thus, an electric actuator having a small-rated torque can be used.

In accordance with a twentieth aspect of the present disclosure, the brake device according to the eighteenth or nineteenth aspect further comprises a rotation restriction mechanism provided between the electric actuator and the input body to restrict rotation of the input body in a case where output torque of the electric actuator is greater than or equal to a third torque. With the brake device according to the twentieth aspect, the rotation restriction mechanism restricts rotation of the input body in a case where the output torque of the electric actuator is greater than or equal to the third torque. This minimizes unnecessary driving of the electric actuator which, in turn, reduces the electric power consumption of the electric actuator.

In accordance with a twenty-first aspect of the present disclosure, the brake device according to any one of the first to twentieth aspects further comprises a disc brake including a disc rotor. The rotational body includes the disc rotor. The brake device according to the twenty-first aspect actuates the brake in a brake device including the disc brake in a preferred manner.

The human-powered vehicle brake device of the present disclosure actuates the brake in a preferred manner.

BRIEF DESCRIPTION OF THE DRAWINGS

Referring now to the attached drawings which form a part of this original disclosure.

DETAILED DESCRIPTION

Figure 1:
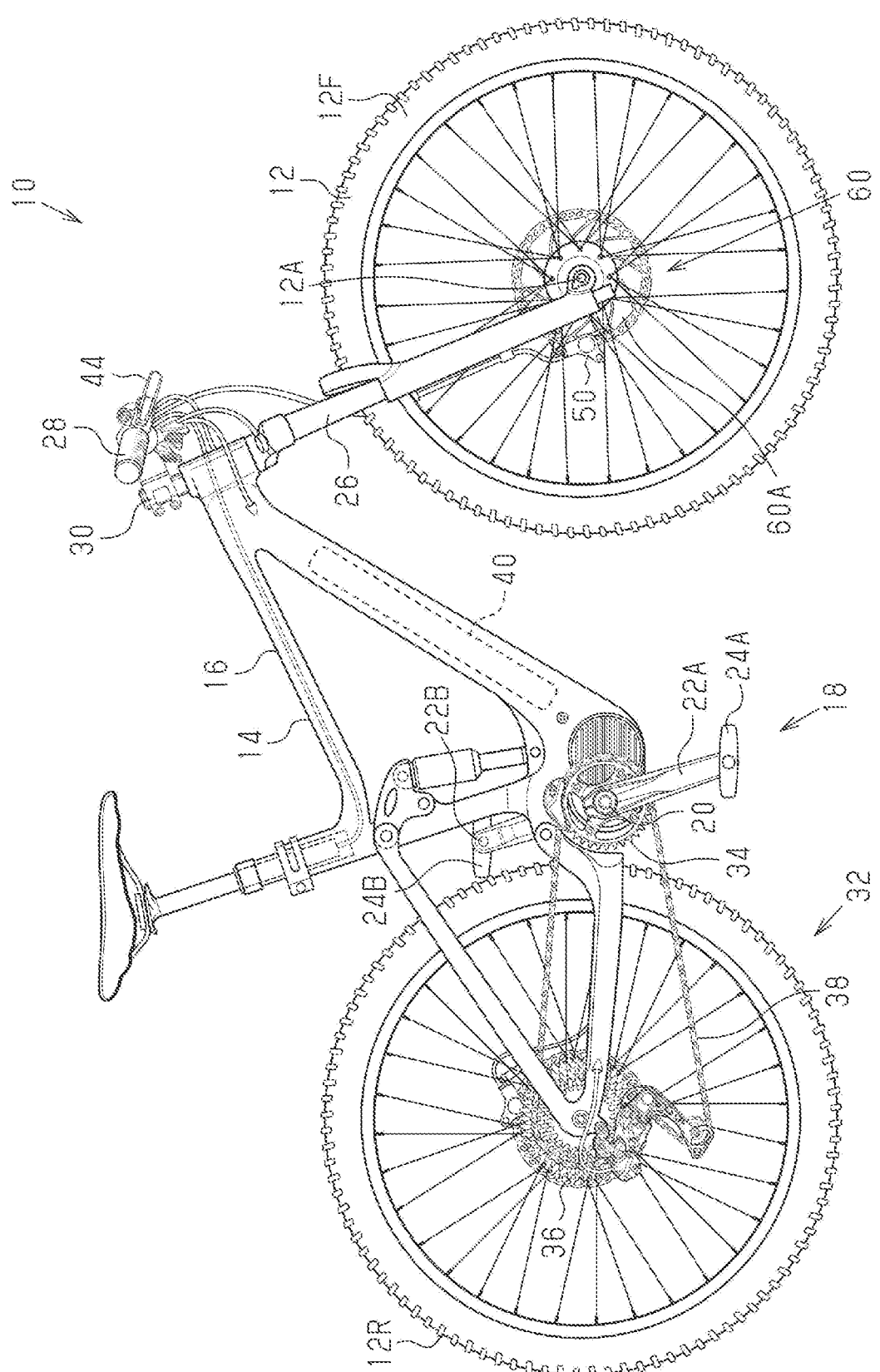
FIG. 1 is a side elevational view of a human-powered vehicle including a human-powered vehicle brake device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A brake device 50 for a human-powered vehicle will now be described with reference to FIGS. 1 to 17. A human-powered vehicle is a vehicle that includes at least one wheel and can be driven by at least a human driving force. Examples of the human-powered vehicle include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a drive force of an electric motor for propulsion in addition to a human driving force. The E-bike includes an electric assist bicycle that assists in propulsion with an electric motor. In each embodiment described hereafter, the human-powered vehicle will be described as a bicycle.

In the present specification, the frame of reference for the terms indicating directions such as "front", "rear", "forward", "rearward", "left", "right", "sideward", "upward", "downward", as well as other analogous terms indicating directions will be based on the view of a rider facing a handlebar from a reference position (for example, on saddle or seat) of the human-powered vehicle.

A human-powered vehicle 10 includes at least one wheel 12 and a vehicle body 14. The at least one wheel 12 includes a front wheel 12F and a rear wheel 12R. The vehicle body 14 includes a frame 16. The human-powered vehicle 10 further includes a crank 18 to which a human driving force is input. The crank 18 includes a crank axle 20 and two crank arms 22A and 22B. The crank axle 20 is rotatable relative to the frame 16. The crank arms 22A and 22B are provided on two axial ends of the crank axle 20, respectively. Two pedals 24A and 24B are coupled to the crank arms 22A and 22B, respectively.

A front fork 26 is connected to the frame 16. The front wheel 12F is attached to the front fork 26. A handlebar 28 is coupled to the front fork 26 by a stem 30. The rear wheel 12R is supported by the frame 16. In the present embodiment, the rear wheel 12R is the drive wheel. For example, the crank 18 is linked to the rear wheel 12R by a drive mechanism 32. The rear wheel 12R is driven by rotation of the crank axle 20. At least one of the front wheel 12F and the rear wheel 12R can be linked to the crank 18 by the drive mechanism 32.

The drive mechanism 32 includes a first drive mechanism rotational body 34, a second drive mechanism rotational body 36, and a transferring member 38. For example, the first drive mechanism rotational body 34 is coupled to the crank axle 20. The first drive mechanism rotational body 34 includes, for example, a front sprocket. The first drive mechanism rotational body 34 can include a pulley or a bevel gear. The second drive mechanism rotational body 36 includes a rear sprocket. The second drive mechanism rotational body 36 can include a pulley or a bevel gear. The transferring member 38 is configured to transmit a rotational force of the first drive mechanism rotational body 34 to the second drive mechanism rotational body 36. The transferring member 38 includes, for example, a chain. The transferring member 38 can include a belt or a shaft.

The chain is wound around, for example, the front sprocket and the rear sprocket. In an example, the rotational force input to the front sprocket is transmitted to the front sprocket, the chain, the rear sprocket, and the rear wheel 12R in this order.

The human-powered vehicle 10 further includes, for example, a battery 40. The battery 40 includes one or more battery cells. Each battery cell includes a rechargeable battery. For example, the battery 40 is configured to supply electric power to an electronic controller 46 is a computer, and will be hereinafter referred to as the controller 46. The terms "electronic controller" and "controller" as used herein refer to hardware that executes a software program, and does not include a human being. The battery 40 is connected to the controller 46 via an electric cable or a wireless communication device in a manner allowing for communication. The battery 40 is configured to perform communication with the controller 46 through, for example, power line communication (PLC), Controller Area Network (CAN), or universal asynchronous receiver/transmitter (UART).

The brake device 50 for a human-powered vehicle includes an input body 52 to which a driving force is input, a brake 54, and a power converter 56. The brake device 50 further includes, for example, a housing 58. The housing 58 includes, for example, an internal area. For example, at least part of the brake 54, the input body 52, and the power converter 56 are disposed in the internal area of the housing 58. For example, the double-dashed lines shown in FIG. 4 indicate inner surfaces of inner walls of the housing 58.

The brake 54 is configured to contact a rotational body 42 of the human-powered vehicle 10. For example, the brake 54 is configured to brake the rotational body 42 by contacting the rotational body 42. The brake 54 includes, for example, a friction member 54A. The brake device 50 further includes, for example, an additional brake 50A. The additional brake 50A includes, for example, an additional friction member 50B. The brake device 50 can include the additional brake 50A instead of or in addition to the brake 54. Alternatively, the additional brake 50A can be omitted. In the present embodiment, the brake device 50 includes both of the brake 54 and the additional brake 50A.

In an example, the friction member 54A is supported by a support portion included in the brake 54. The support portion is formed from, for example, a metal material. In an example, the additional friction member 50B is supported by a support portion included in the additional brake 50A. In an example, the brake 54 and the additional brake 50A are disposed to sandwich the rotational body 42 between brake 54 and the additional brake 50A.

In an example, the brake 54 is configured to be actuated by the input body 52 and the power converter 56. In addition to the brake 54, the additional brake 50A can be configured to be actuated by the input body 52 and the power converter 56.

In an example in which only the brake 54 is configured to be actuated by the input body 52 and the power converter 56, the additional brake 50A can be provided on the housing 58 such that the additional brake 50A does not move relative to the housing 58. In an example in which only the brake 54 is configured to be actuated by the input body 52 and the power converter 56, the brake device 50 can include one input body 52 and one power converter 56 that correspond to the brake 54. In an example in which the brake device 50 includes one input body 52 and one power converter 56, the brake device 50 can include a distribution mechanism that distributes a force resulting from the linear motion of the brake 54 to the brake 54 and the additional brake 50A.

Both of the brake 54 and the additional brake 50A can be configured to be actuated by the input body 52 and the power converter 56. In a case where both of the brake 54 and the additional brake 50A are configured to be actuated by the input body 52 and the power converter 56, the brake device 50 can include an input body 52 and a power converter 56 that correspond to the additional brake 50A. In an example in which the brake device 50 includes the input bodies 52 and the power converters 56 respectively corresponding to the brake 54 and the additional brake 50A, the brake device 50 can include a distribution mechanism that distributes the driving force to the input body 52 corresponding to the brake 54 and the input body 52 corresponding to the additional brake 50A.

In the present embodiment, the brake device 50 includes one input body 52 and one power converter 56 that correspond to the brake 54. In an example, the driving force input to the input body 52 moves the brake 54 with the power converter 56. In an example in which the input body 52 and the power converter 56 actuate the brake 54 such that the friction member 54A comes into contact with the rotational body 42, the rotational body 42 is braked.

In an example in which the brake device 50 brakes the rotational body 42, the brake 54 is moved toward the rotational body 42 in a predetermined direction. In a case where the brake device 50 cancels braking of the rotational body 42, the brake 54 is moved away from the rotational body 42 in a predetermined direction. The predetermined direction is, for example, a linear direction. In an example, the braking force applied to the rotational body 42 by the brake 54 changes in accordance with a movement amount of the brake 54 in the predetermined direction.

In an example, the friction member 54A contacts the rotational body 42 to brake the rotational body 42. In an example, the friction member 54A contacts the rotational body 42 to bend the rotational body 42. In an example in which the rotational body 42 is bent, the rotational body 42 contacts the additional friction member 50B. In an example, the friction member 54A and the additional friction member 50B contact the rotational body 42 to brake the rotational body 42.

In an example, the position of the additional friction member 50B relative to the rotational body 42 can be adjusted with a tool or the like. In an example in which the position of the additional friction member 50B relative to the rotational body 42 is adjusted, the braking force applied by the brake device 50 is adjusted.

In an example, the brake device 50 includes a front brake device provided on the front wheel 12F to brake the rotational body 42 that is rotated integrally with the front wheel 12F. The brake device 50 can include a rear brake device provided on the rear wheel 12R to brake the rotational body 42 that is rotated integrally with the rear wheel 12R. The brake device 50 can include only one of or both of the front brake device and the rear brake device. In the present embodiment, the brake device 50 includes one of the front brake device and the rear brake device. In the present embodiment, the brake device 50 includes the front brake device.

In the present embodiment, the brake device 50 includes a disc brake 60. The disc brake 60 includes, for example, a disc rotor 60A. The rotational body 42 includes, for example, the disc rotor 60A. The disc rotor 60A is provided on, for example, a hub 12A of the wheel 12. The brake 54 includes, for example, a brake pad.

The brake device 50 can include, for example, a rim brake or a roller brake. In an example in which the brake device 50 includes a rim brake, the rotational body 42 includes a rim of the wheel 12. In an example in which the brake device 50 includes a roller brake, the rotational body 42 includes a drum. The brake device 50 can be any device that brakes the rotational body 42 of the human-powered vehicle 10. The brake 54 can include, for example, a brake shoe.

The human-powered vehicle 10 further includes an operating device 44 for operating the brake device 50. The operating device 44 is provided on, for example, the handlebar 28. The operating device 44 includes, for example, a lever. In an example, the brake device 50 is driven in accordance with operation of the operating device 44.

In an example, the operating device 44 is provided on at least one of a right side of the handlebar 28 and a left side of the handlebar 28. In an example in which the brake device 50 includes both of the front brake device and the rear brake device, an operating device 44 that corresponds to the front brake device is provided on the right side of the handlebar 28, and an operating device 44 that corresponds to the rear brake device is provided on the left side of the handlebar 28. In an example in which the brake device 50 includes both of the front brake device and the rear brake device, an operating device 44 that corresponds to the front brake device can be provided on the left side of the handlebar 28, and an operating device 44 that corresponds to the rear brake device can be provided on the right side of the handlebar 28.

In the present embodiment, the operating device 44 that corresponds to the front brake device is provided on the right side of the handlebar 28. In the present embodiment, the operating device 44 that corresponds to the front brake device can be provided on the left side of the handlebar 28. The operating device 44 is provided on the handlebar 28 to be operated by a rider gripping the handlebar 28.

The human-powered vehicle 10 further includes, for example, the controller 46. The controller 46 includes, for example, at least one processor that executes predetermined control programs. The processor(s) of the controller 46 includes, for example, a central processing unit (CPU) or a micro-processing unit (MPU). The electronic controller 46 is formed of one or more semiconductor chips that are mounted on a circuit board. In the case where the controller 46 can include a plurality of processors, the processors of the controller 46 can be provided at separate positions. The controller 46 can include one or more microcomputers.

The human-powered vehicle 10 further includes, for example, a storage 48. The storage 48 is any computer storage device or any non-transitory computer-readable medium with the sole exception of a transitory, propagating signal. The storage 48 stores, for example, control programs and information used for control processes. The storage 48 includes, for example, a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM).

In an example, the controller 46 is configured to perform at least one of wireless communication and wired communication with the operating device 44. In the present embodiment, the controller 46 is configured to perform wired communication with the operating device 44. The controller 46 is connected to the battery 40 in a manner allowing for wired communication. The controller 46 is configured to be supplied with the electric power from the battery 40. The controller 46 can be connected to the battery 40 in a manner allowing for wireless communication.

The brake device 50 further includes, for example, an electric actuator 62. The electric actuator 62 is configured to transmit a driving force to the input body 52. The electric actuator 62 includes, for example, an electric motor. Instead of an electric motor, the electric actuator 62 can include a solenoid. In an example, the electric actuator 62 includes an output shaft that is rotated in a case where the electric actuator 62 is driven. In an example, the electric actuator 62 is connected to the controller 46 in a manner allowing for wireless communication or wired communication. In the present embodiment, the electric actuator 62 is connected to the controller 46 in a manner allowing for wired communication. The controller 46 is configured to control the electric actuator 62.

The brake device 50 further includes, for example, a speed reducer 64 provided between the electric actuator 62 and the input body 52. In an example, the speed reducer 64 is configured so that, in one or more steps, the rotational speed of an output unit of the speed reducer 64 becomes lower than the rotational speed of an input unit of the speed reducer 64, to which the driving force of the electric actuator 62 is input. The speed reducer 64 can include a set of gears, a set of a belt and pulleys, or a set of a chain and sprockets.

The brake device 50 further includes, for example, a rotation restriction mechanism 66. The rotation restriction mechanism 66 is provided, for example, between the electric actuator 62 and the input body 52. In an example, the rotation restriction mechanism 66 restricts rotation of the input body 52 in a case where an output torque of the electric actuator 62 is greater than or equal to a third torque.

The rotation restriction mechanism 66 includes, for example, a worm drive. The rotation restriction mechanism 66 can include a lock-type TORQUE DIODE®. In an example in which the output torque of the electric actuator 62 changes from less than the third torque to greater than or equal to the third torque, the rotation restriction mechanism 66 restricts rotation of the input body 52 to restrict movement of the brake 54. In an example in which movement of the brake 54 is restricted in a state where the friction member 54A is in contact with the rotational body 42, the friction member 54A remains in contact with the rotational body 42. In an example, the controller 46 is configured to control the electric actuator 62 so that the output torque of the electric actuator 62 is less than or equal to a fourth torque. The fourth torque is, for example, greater than or equal to the third torque.

The electric actuator 62 is provided in, for example, the housing 58. In an example, at least part of the electric actuator 62, at least part of the speed reducer 64, and at least part of the rotation restriction mechanism 66 are disposed in the internal area of the housing 58. In an example, the driving force of the electric actuator 62 is transmitted to the speed reducer 64, the rotation restriction mechanism 66, the input body 52, the power converter 56, and the brake 54 in this order.

The input body 52 includes, for example, an input rotational shaft 52A, a first input rotational body 52B provided on the input rotational shaft 52A, and a second input rotational body 52C provided on the input rotational shaft

52A. In an example, the first input rotational body 52B and the second input rotational body 52C are supported by the input rotational shaft 52A. In an example, the first input rotational body 52B is spaced apart from the second input rotational body 52C in an axial direction of the input rotational shaft 52A.

In an example, the first input rotational body 52B is formed integrally with the input rotational shaft 52A. In an example, the first input rotational body 52B can be formed separately from the input rotational shaft 52A and attached to the input rotational shaft 52A in a manner restricting relative rotation. In an example, the second input rotational body 52C is formed integrally with the input rotational shaft 52A. In an example, the second input rotational body 52C can be formed separately from the input rotational shaft 52A and attached to the input rotational shaft 52A in a manner restricting relative rotation.

In an example, the second input rotational body 52C has an outer diameter that differ from that of the first input rotational body 52B. In an example, the first input rotational body 52B has a larger outer diameter than the second input rotational body 52C. The first input rotational body 52B and the second input rotational body 52C include gears. In an example, the gear of the first input rotational body 52B has more teeth than the gear of the second input rotational body 52C.

The power converter 56 includes, for example, a first shaft 68, a first rotational body 70, a second rotational body 72, a first converter 74, and a second converter 76. The first shaft 68 is rotatable relative to the housing 58. The first rotational body 70 is provided on, for example, the first shaft 68. The second rotational body 72 is provided on, for example, the first shaft 68.

In an example, the first rotational body 70 and the second rotational body 72 are supported by the first shaft 68. In an example, the first rotational body 70 is formed separately from the first shaft 68. In an example, the second rotational body 72 is formed separately from the first shaft 68. In an example, the power converter 56 has a first center axis C1. In an example, the first shaft 68 has a rotational center axis that coincides with the first center axis C1. In an example, the input rotational shaft 52A has a second center axis C2. The second center axis C2 is substantially parallel to the first center axis C1.

In an example, the second rotational body 72 has an outer diameter that differs from that of the first rotational body 70. In an example, the first rotational body 70 has a smaller outer diameter than the second rotational body 72. The first rotational body 70 and the second rotational body 72 each include, for example, a gear. In an example, the gear of the first rotational body 70 has less teeth than the gear of the second rotational body 72. In an example, the first rotational body 70 is engaged with the first input rotational body 52B. In an example, the second rotational body 72 is engaged with the second input rotational body 52C.

In a case where a rotational force is transmitted from the gear of the first input rotational body 52B to the gear of the first rotational body 70, the gear of the first input rotational body 52B and the gear of the first rotational body 70 form a speed-increasing mechanism or a speed-reducing mechanism. In a case where a rotational force is transmitted from the gear of the second input rotational body 52C to the gear of the second rotational body 72, the gear of the second input rotational body 52C and the gear of the second rotational body 72 form a speed-increasing mechanism or a speed-reducing mechanism.

In a case where the gear of the first input rotational body 52B and the gear of the first rotational body 70 form a speed-increasing mechanism, the rotational speed of the first rotational body 70 is greater than that of the first input rotational body 52B. In a case where the gear of the first input rotational body 52B and the gear of the first rotational body 70 form a speed-reducing mechanism, the rotational speed of the first rotational body 70 is less than that of the first input rotational body 52B.

In a case where the gear of the second input rotational body 52C and the gear of the second rotational body 72 form a speed-increasing mechanism, the rotational speed of the second rotational body 72 is greater than that of the second input rotational body 52C. In a case where the gear of the second input rotational body 52C and the gear of the second rotational body 72 form a speed-reducing mechanism, the rotational speed of the second rotational body 72 is less than that of the second input rotational body 52C.

In a case where the rotational speed of the first input rotational body 52B is the same as that of the second input rotational body 52C, the rotational speed of the second rotational body 72 is greater than that of the first rotational body 70. In an example, the gear of the first input rotational body 52B and the gear of the first rotational body 70 form a speed-increasing mechanism, and the gear of the second input rotational body 52C and the gear of the second rotational body 72 form a speed-reducing mechanism.

In an example in which the gear of the first input rotational body 52B and the gear of the first rotational body 70 form a speed-reducing mechanism, and the gear of the second input rotational body 52C and the gear of the second rotational body 72 also form a speed-reducing mechanism, the rotational force is transmitted from the gear of the first input rotational body 52B to the gear of the first rotational body 70 at a first speed reduction ratio that is smaller than a second speed reduction ratio at which the rotational force is transmitted from the gear of the second input rotational body 52C to the gear of the second rotational body 72.

In an example, the first shaft 68 is configured to be movable relative to the first rotational body 70 and the second rotational body 72 in a direction X that is parallel to the first center axis C1. A bearing including a needle bearing or a sleeve can be provided between the first rotational body 70 and the first shaft 68.

In an example, the second rotational body 72 includes an inner circumferential portion 72A where a first groove 72B is formed. In an example, the first groove 72B is formed in the inner circumferential portion 72A of the second rotational body 72 to extend in the direction X that is parallel to the first center axis C1. In an example, the first shaft 68 includes an outer circumferential portion 68A where a second groove 68B is formed. In an example, the second groove 68B is formed in the outer circumferential portion 68A of the first shaft 68 to extend in the direction X that is parallel to the first center axis C1.

In an example, the first groove 72B is provided in the inner circumferential portion 72A of the second rotational body 72 in correspondence with the second groove 68B. In an example, at least one first groove 72B is formed in the inner circumferential portion 72A of the second rotational body 72. In an example, at least one second groove 68B is formed in the outer circumferential portion 68A of the first shaft 68. In an example, three first grooves 72B are formed in the inner circumferential portion 72A of the second rotational body 72. In an example, three second grooves 68B are formed in the outer circumferential portion 68A of the first shaft 68. There is no limitation to the number of first grooves 72B and the number of second grooves 68B as long as the numbers are the same.

In an example, a first rolling element 78 is provided between the first groove 72B and the second groove 68B. In an example, one first rolling element 78 is provided between one first groove 72B and one second groove 68B. The first rolling element 78 includes, for example, a ball. In an example, the first rolling element 78 is arranged in the second groove 68B in a manner movable between a first end 68C and a second end 68D of the second groove 68B. In an example, the first rolling element 78 supports the second rotational body 72 so that the second rotational body 72 is rotatable integrally with the first shaft 68 in a circumferential direction with respect to the first center axis C1 and so that the second rotational body 72 is movable relative to the first shaft 68 in the direction X that is parallel to the first center axis C1. In an example, the first rolling element 78 is configured to transmit the rotational force of the second rotational body 72 to the first shaft 68. In an example, the second rotational body 72, the first rolling element 78, and the first shaft 68 form a ball spline.

In an example, the first converter 74 is provided on the first shaft 68 and converts rotational motion to linear motion. The first converter 74 includes, for example, a first engagement portion 74A and a second engagement portion 74B. The first engagement portion 74A is provided on, for example, the first rotational body 70 at a portion 70A that differs from a portion engaged with the first input rotational body 52B.

In an example, the portion 70A extends in the direction X that is parallel to the first center axis C1. A bearing including a needle bearing or a sleeve can be provided between the portion 70A and the first shaft 68.

In an example, the second engagement portion 74B is provided on the first shaft 68 in a manner movable relative to the first shaft 68 in the direction X that is parallel to the first center axis C1. In an example, the second engagement portion 74B engages the first engagement portion 74A. In an example, the second engagement portion 74B is cylindrical. In an example, the second engagement portion 74B is formed separately from the first shaft 68.

In an example, one of the first engagement portion 74A and the second engagement portion 74B includes a female thread, and the other one of the first engagement portion 74A and the second engagement portion 74B includes a male thread. In the present embodiment, the first engagement portion 74A includes a male thread, and the second engagement portion 74B includes a female thread. In an example, the female thread is provided in an inner circumferential portion 74C of the second engagement portion 74B. In an example, a ball bearing can be provided between the first engagement portion 74A and the second engagement portion 74B. In this case, the first engagement portion 74A and the second engagement portion 74B can form a ball screw with the ball bearing.

In an example, the second converter 76 is provided on the first shaft 68 and converts rotational motion to linear motion. The second converter 76 includes, for example, a third engagement portion 76A and a fourth engagement portion 76B. The third engagement portion 76A is provided on the first shaft 68 in a manner nonrotatable relative to the housing 58. The fourth engagement portion 76B is provided on the first shaft 68.

In an example, the third engagement portion 76A is configured to be moved integrally with the second engagement portion 74B relative to the first shaft 68 in the direction X that is parallel to the first center axis C1. In an example, the third engagement portion 76A is formed separately from the first shaft 68. The third engagement portion 76A includes, for example, a first member 82 and a second member 84. In an example, the third engagement portion 76A is provided in the housing 58 such that the third engagement portion 76A does not rotate relative to the housing 58.

In an example, the first member 82 is cylindrical and is provided on the first shaft 68 about the first center axis C1. In an example, the second member 84 is arranged on an outer circumferential portion 82A of the first member 82 about the first center axis C1. The third engagement portion 76A includes, for example, a third member 82B that engages the fourth engagement portion 76B. In an example, the third member 82B is formed integrally with the first member 82. The third member 82B has a circular shape as viewed in the direction X that is parallel to the first center axis C1. In an example, the third member 82B has a larger outer diameter than the first member 82.

In an example, the first member 82 includes a third groove 82C in the outer circumferential portion 82A. In an example, the third groove 82C is formed in the outer circumferential portion 82A of the first member 82 to extend in the direction X that is parallel to the first center axis C1. In an example, the second member 84 includes an inner circumferential portion 84A where a fourth groove 84B is formed. In an example, the fourth groove 84B is formed in the inner circumferential portion 84A of the second member 84 to extend in the direction X that is parallel to the first center axis C1.

In an example, the third groove 82C is provided in the outer circumferential portion 82A of the first member 82 in correspondence with the fourth groove 84B. In an example, at least one third groove 82C is formed in the outer circumferential portion 82A of the first member 82. In an example, at least one fourth groove 84B is formed in the inner circumferential portion 84A of the second member 84. In an example, three third grooves 82C are formed in the outer circumferential portion 82A of the first member 82. In an example, three fourth grooves 84B are formed in the inner circumferential portion 84A of the second member 84. There is no limitation to the number of third grooves 82C and the number of fourth grooves 84B as long as the numbers are the same.

In an example, a second rolling element 86 is provided between the third groove 82C and the fourth groove 84B. In an example, the number of second rolling elements 86 provided between the third grooves 82C and the fourth grooves 84B is the same as the number of the third grooves 82C and the number of the fourth grooves 84B. The second rolling element 86 includes, for example, a ball. The second rolling element 86 can include a roller. In an example, the second rolling element 86 is configured to be moved between a third end 82D of the third groove 82C and the third member 82B.

In an example, a rotational force conversion structure 82E is provided between the first member 82 and the fourth engagement portion 76B in the direction X that is parallel to the first center axis C1. The rotational force conversion structure 82E includes a cam structure or a screw structure. The rotational force conversion structure 82E converts rotational motion resulting from the rotational force transmitted from the second rotational body 72 to the first shaft 68 into linear motion.

In an example, the fourth engagement portion 76B is configured to be moved relative to the first shaft 68 and the second engagement portion 74B in the direction X that is parallel to the first center axis C1. In an example, the fourth engagement portion 76B is formed integrally with the first shaft 68. In an example, the fourth engagement portion 76B and the input rotational shaft 52A can be formed separately and coupled to each other in a manner restricting relative rotation. In an example, the fourth engagement portion 76B has a circular shape as viewed in the direction X that is parallel to the first center axis C1. In an example, the fourth engagement portion 76B has a larger outer diameter than the first shaft 68.

In an example, the brake 54 is provided on an end 68E of the first shaft 68 in the direction X that is parallel to the first center axis C1. In an example, the second rotational body 72, the first rotational body 70, the second engagement portion 74B, the third engagement portion 76A, the fourth engagement portion 76B, and the brake 54 are provided on the first shaft 68 in order of the second rotational body 72, the first rotational body 70, the second engagement portion 74B, the third engagement portion 76A, the fourth engagement portion 76B, and the brake 54 in the direction X that is parallel to the first center axis C1.

In an example, the second rotational body 72 is arranged on the first shaft 68 at a portion farthest from the end 68E. In an example, the first rotational body 70 is arranged on the first shaft 68 at a portion closer to the end 68E than the second rotational body 72. In an example, the second engagement portion 74B is arranged on the first shaft 68 at a portion closer to the end 68E than the first rotational body 70. In an example, the third engagement portion 76A is arranged on the first shaft 68 at a portion closer to the end 68E than the second engagement portion 74B.

In an example, a first support 80A is disposed between the second engagement portion 74B and the third engagement portion 76A in the direction X that is parallel to the first center axis C1. The first support 80A is configured to reduce a frictional force between the second engagement portion 74B and the third engagement portion 76A in a case where the second engagement portion 74B is rotated relative to the third engagement portion 76A. The first support 80A includes, for example, rolling elements and a first cage that holds the rolling elements. The rolling elements include, for example, balls.

In an example, the fourth engagement portion 76B is arranged on the first shaft 68 at a portion closer to the end 68E than the third engagement portion 76A. The third member 82B of the third engagement portion 76A includes, for example, a fifth groove 88A. In an example, the fifth groove 88A is formed in a surface 82F of the third member 82B facing the fourth engagement portion 76B. In an example, the fifth groove 88A extends in a circumferential direction of the surface 82F. The fourth engagement portion 76B includes, for example, a sixth groove 88B. In an example, the sixth groove 88B is formed in a surface 76C of the fourth engagement portion 76B facing the third member 82B. In an example, the sixth groove 88B extends in a circumferential direction of the surface 76C.

In an example, the fifth groove 88A is formed in the surface 82F in correspondence with the sixth groove 88B. In an example, the sixth groove 88B is formed in the surface 76C in correspondence with the fifth groove 88A. In an example, a number of fifth grooves 88A are formed separately in the surface 82F. In an example, three fifth grooves 88A are formed separately in the surface 82F. In an example, a number of sixth grooves 88B are formed separately in the surface 76C. In an example, three sixth grooves 88B are formed separately in the surface 76C.

In an example, the fifth groove 88A and the sixth groove 88B include a cam structure. In an example, the cam structure of the fifth groove 88A and the sixth groove 88B converts rotational motion, produced from the rotational force transmitted from the second rotational body 72 to the first shaft 68, into linear motion.

In an example, a third rolling element 90 is provided between the fifth groove 88A and the sixth groove 88B. In an example, the number of third rolling elements 90 provided between the fifth grooves 88A and the sixth grooves 88B is the same as the number of the fifth grooves 88A and the number of the sixth grooves 88B. The third rolling element 90 includes a ball. The third rolling element 90 can include a roller.

In an example, the third rolling element 90 is configured to be moved in the fifth groove 88A and the sixth groove 88B in the circumferential direction of the surface 82F of the third member 82B facing the fourth engagement portion 76B. In an example, the third rolling element 90 is sized such that even in a case where the fourth engagement portion 76B is moved toward the brake 54, the third rolling element 90 is engageable with the fifth groove 88A and the sixth groove 88B in the direction X that is parallel to the first center axis C1.

In an example, a second support 80B is disposed between the fourth engagement portion 76B and the brake 54. The second support 80B is configured to reduce a frictional force between the fourth engagement portion 76B and the brake 54 in a case where the fourth engagement portion 76B is rotated relative to the brake 54. The second support 80B includes, for example, rolling elements and a second cage that holds the rolling elements. The rolling elements include, for example, balls.

In an example, the power converter 56 converts a force of the input body 52 to a force that moves the brake 54 toward the rotational body 42. The power converter 56 includes a transmission 92. The transmission 92 is configured to change a ratio R of a movement amount of the brake 54 to an output amount of the input body 52. The movement amount of the brake 54 is a movement amount of the brake 54 in the predetermined direction. In the present embodiment, the predetermined direction substantially coincides with the direction X that is parallel to the first center axis C1. The force of the input body 52 includes, for example, a rotational force.

In an example, the power converter 56 converts the rotational force of the input body 52 to a force that moves the brake 54 toward the rotational body 42. The transmission 92 is configured to change a ratio R of a movement amount of the brake 54 to an output rotational speed of the input body 52. The force of the input body 52 can include a force other than a rotational force. A force other than a rotational force includes, for example, a force of linear motion. In the present embodiment, in an example in which the force of the input body 52 includes a force of linear motion, a mechanism that converts a linear motion to a rotational force is provided between the input body 52 and the first rotational body 70 and between the input body 52 and the second rotational body 72.

The transmission 92 includes, for example, a first restriction mechanism 94 and a second restriction mechanism 96. In an example, the first restriction mechanism 94 is configured to restrict rotation of the second engagement portion 74B relative to the housing 58. The first restriction mechanism 94 is configured to permit rotation of the second engagement portion 74B relative to the housing 58 in a case where the torque input to the second engagement portion 74B is greater than or equal to a first torque and restrict rotation of the second engagement portion 74B relative to the housing 58 in a case where the torque input to the second engagement portion 74B is less than the first torque.

The first restriction mechanism 94 includes, for example, a rotation restrictor 98. In an example, the rotation restrictor 98 is provided in the housing 58 in a manner nonrotatable relative to the housing 58. The rotation restrictor 98 is, for example, cylindrical. The rotation restrictor 98 is provided on an outer circumferential portion 74D of the second engagement portion 74B surrounding the second engagement portion 74B.

The rotation restrictor 98 includes, for example, a holder 98A, a biasing portion 98B, a pressing portion 98C, and a contact portion 98D. In an example, the holder 98A is configured to be cylindrical and extend in the direction X that is parallel to the first center axis C1. The holder 98A includes, for example, an outer circumferential portion 98E, an inner circumferential portion 98F, and a hole 98G that connects the outer circumferential portion 98E of the holder 98A and the inner circumferential portion 98F of the holder 98A. In an example, the hole 98G is formed to extend in a radial direction of the holder 98A. The pressing portion 98C is disposed in the hole 98G. In an example, the pressing portion 98C is cylindrical and is disposed in the hole 98G to extend in the radial direction of the holder 98A.

In an example, the contact portion 98D is provided between the pressing portion 98C and the second engagement portion 74B. In an example, the contact portion 98D is provided on the pressing portion 98C in a manner rotatable relative to the pressing portion 98C. The second engagement portion 74B includes, for example, a seventh groove 74E. The seventh groove 74E is formed in, for example, the outer circumferential portion 74D of the second engagement portion 74B. In an example, the seventh groove 74E is formed in the outer circumferential portion 74D of the second engagement portion 74B to extend in the direction X that is parallel to the first center axis C1. In an example, the contact portion 98D arranged in the seventh groove 74E restricts rotation of the second engagement portion 74B.

The contact portion 98D includes, for example, a ball. The contact portion 98D can include a roller. In an example, the contact portion 98D is provided on an end of the pressing portion 98C. In an example, the biasing portion 98B is provided on the other end of the pressing portion 98C. The biasing portion 98B includes, for example, a coil spring. The biasing portion 98B can include a leaf spring. The biasing portion 98B can include a component other than a coil spring or a leaf spring as long as the component is configured to bias the pressing portion 98C against the second engagement portion 74B. In an example, an end of the biasing portion 98B is attached to the pressing portion 98C. In an example, the other end of the biasing portion 98B is attached to the housing 58.

The hole 98G includes, for example, at least one hole 98G. The biasing portion 98B includes, for example, at least one biasing portion 98B. The pressing portion 98C includes, for example, at least one pressing portion 98C. The contact portion 98D includes, for example, at least one contact portion 98D. In an example, one of the at least one pressing portion 98C is arranged in one of the at least one hole 98G. In an example, one of the at least one biasing portion 98B and one of the at least one contact portion 98D are attached to the one of the at least one pressing portion 98C.

The at least one hole 98G includes two or more holes 98G. For example, three holes 98G are provided. In an example, three holes 98G are provided in the holder 98A in a circumferential direction in equal intervals. In an example, the rotation restrictor 98 can be configured so that the rotation restrictor 98 includes each one of the hole 98G, the biasing portion 98B, the pressing portion 98C, and the contact portion 98D, and so that the seventh groove 74E includes at least one seventh groove 74E. In an example, the rotation restrictor 98 can be configured so that the rotation restrictor 98 includes each one of the hole 98G, the biasing portion 98B, the pressing portion 98C, and the contact portion 98D, and so that at least one seventh groove 74E includes three seventh grooves 74E.

In a case where the torque input to the second engagement portion 74B is less than the first torque, the contact portion 98D is fitted into the seventh groove 74E, which, in turn, restricts rotation of the second engagement portion 74B relative to the housing 58. In a case where the torque input to the second engagement portion 74B changes from less than the first torque to greater than or equal to the first torque, the contact portion 98D is moved out of the seventh groove 74E, which, in turn, permits rotation of the second engagement portion 74B relative to the housing 58.

In an example, the second restriction mechanism 96 is configured to restrict movement of the second engagement portion 74B relative to the first engagement portion 74A in the direction X that is parallel to the first center axis C1. In an example, the second restriction mechanism 96 restricts movement of the second engagement portion 74B relative to the first engagement portion 74A in the direction X that is parallel to the first center axis C1 in a case where the torque input to the second engagement portion 74B is greater than or equal to a second torque and permits movement of the second engagement portion 74B relative to the first engagement portion 74A in the direction X that is parallel to the first center axis C1 in a case where the torque input to the second engagement portion 74B is less than the second torque.

The second restriction mechanism 96 includes, for example, the first engagement portion 74A and the second engagement portion 74B. The second restriction mechanism 96 includes, for example, a self-locking mechanism. The self-locking mechanism includes, for example, a mechanism in which linear movement of the female thread relative to the male thread is restricted in a case where the torque input to the male thread is greater than or equal to a predetermined torque. The self-locking mechanism can include, for example, a mechanism in which linear movement of the male thread relative to the female thread is restricted in a case where the torque input to the female thread is greater than or equal to a predetermined torque. In the present embodiment, the predetermined torque is the second torque. In an example in which the lead angle of the thread is decreased, the self-locking mechanism will become further effective.

The second restriction mechanism 96 includes, for example, the first engagement portion 74A and the second engagement portion 74B. In an example, the second restriction mechanism 96 restricts movement of the second engagement portion 74B relative to the first engagement portion 74A in the direction X that is parallel to the first center axis C1 in a case where the lead angle of the male thread of the first engagement portion 74A is smaller than a predetermined lead angle and the torque input to the second engagement portion 74B is greater than or equal to the second torque. In an example, the second restriction mechanism 96 permits movement of the second engagement portion 74B relative to the first engagement portion 74A in the direction X that is parallel to the first center axis C1 in a case where the lead angle of the male thread of the first engagement portion 74A is smaller than the predetermined lead angle and the torque input to the second engagement portion 74B is less than the second torque. In an example, the first torque can be the same as or differ from the second torque.

In an example, the transmission 92 is configured to change the ratio R between a first ratio R1 and a second ratio R2. The second ratio R2 differs from the first ratio R1. The first ratio R1 is, for example, greater than the second ratio R2. In an example, a movement amount of the brake 54 is greater in a case where the ratio R is the first ratio R1 than a case where the ratio R is the second ratio R2. In an example, a moving speed of the brake 54 is higher in a case where the ratio R is the first ratio R1 than a case where the ratio R is the second ratio R2.

In an example, the transmission 92 is configured to set the ratio R to the first ratio R1 in a case where the brake 54 is moved toward the rotational body 42 until the brake 54 contacts the rotational body 42. Further, the transmission 92 is configured to set the ratio R to the second ratio R2 as the brake 54 comes into contact with the rotational body 42. The transmission 92 is configured to change the ratio R from the first ratio R1 to the second ratio R2 in accordance with a reaction force produced as the brake 54 comes into contact with the rotational body 42 in a case where the brake 54 is moved toward the rotational body 42.

In an example in which the brake 54 is moved away from the rotational body 42, the transmission 92 is configured to set the ratio R to the second ratio R2 in a state in which the brake 54 is in contact with the rotational body 42, and the transmission 92 is configured to set the ratio R to the first ratio R1 as the brake 54 separates from the rotational body 42. In an example in which the brake 54 is moved away from the rotational body 42 and the brake 54 is in contact with the rotational body 42, the transmission 92 is configured to maintain the ratio R at the second ratio R2 with the reaction force applied to the brake 54 by the rotational body 42.

In an example, the transmission 92 is configured to transmit the rotational force of the input body 52 to the brake 54 through one of a first transmission path and a second transmission path. The first transmission path is configured to set the ratio R to the first ratio R1. The second transmission path is configured to set the ratio R to the second ratio R2.

In an example, the first input rotational body 52B is configured to transmit the rotational force to the first transmission path, and the second input rotational body 52C is configured to transmit the rotational force to the second transmission path. In an example, a force is transmitted through the first transmission path in order of the first rotational body 70, the first converter 74, the second converter 76, and the brake 54. In an example, a force is transmitted through the second transmission path in order of the second rotational body 72, the first shaft 68, the fourth engagement portion 76B, and the brake 54.

Figure 13:
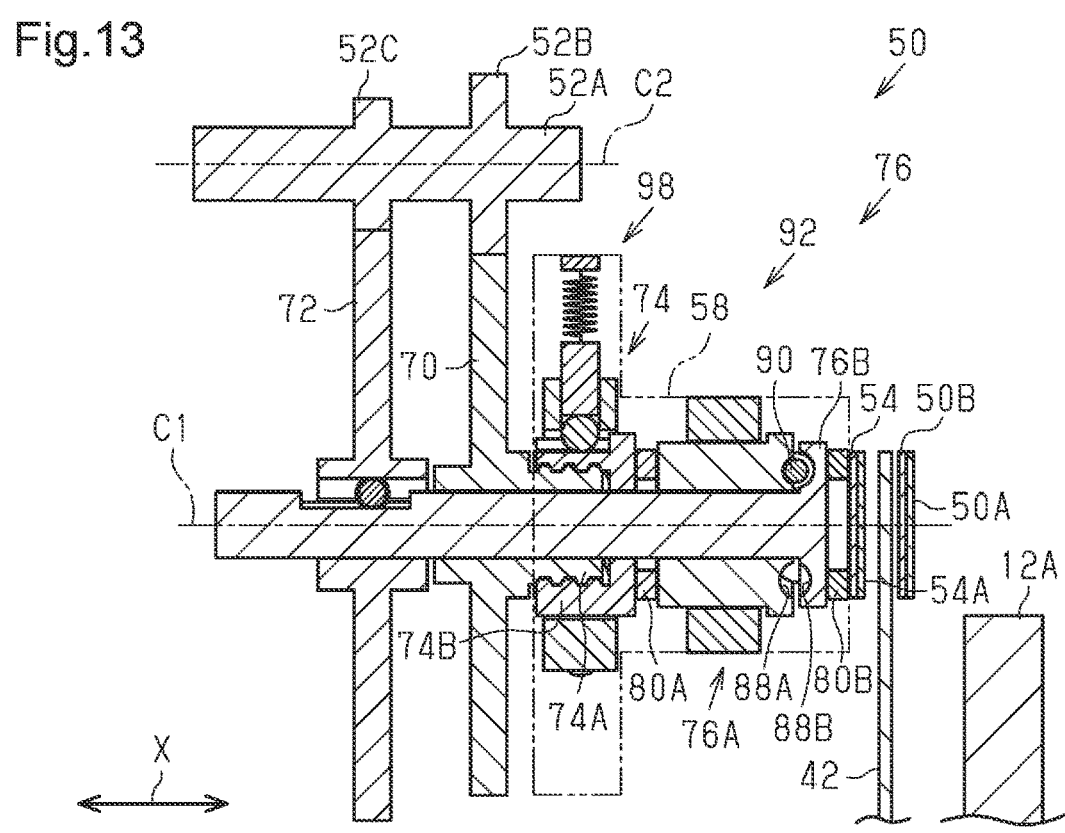
FIG. 13 is a cross-sectional view of the input body, the brake, the power converter, and the housing in a state where the brake shown in FIG. 4 is separated from a rotational body.

An example of actuation of the brake device 50 will now be described with reference to FIGS. 13 to 17. FIG. 13 shows a state in which a force is not transmitted to the first input rotational body 52B or the second input rotational body 52C. In a case where a force is not transmitted to the first input rotational body 52B or the second input rotational body 52C, the brake 54 is located at a first position where the friction member 54A is separated from the rotational body 42.

Figure 14:
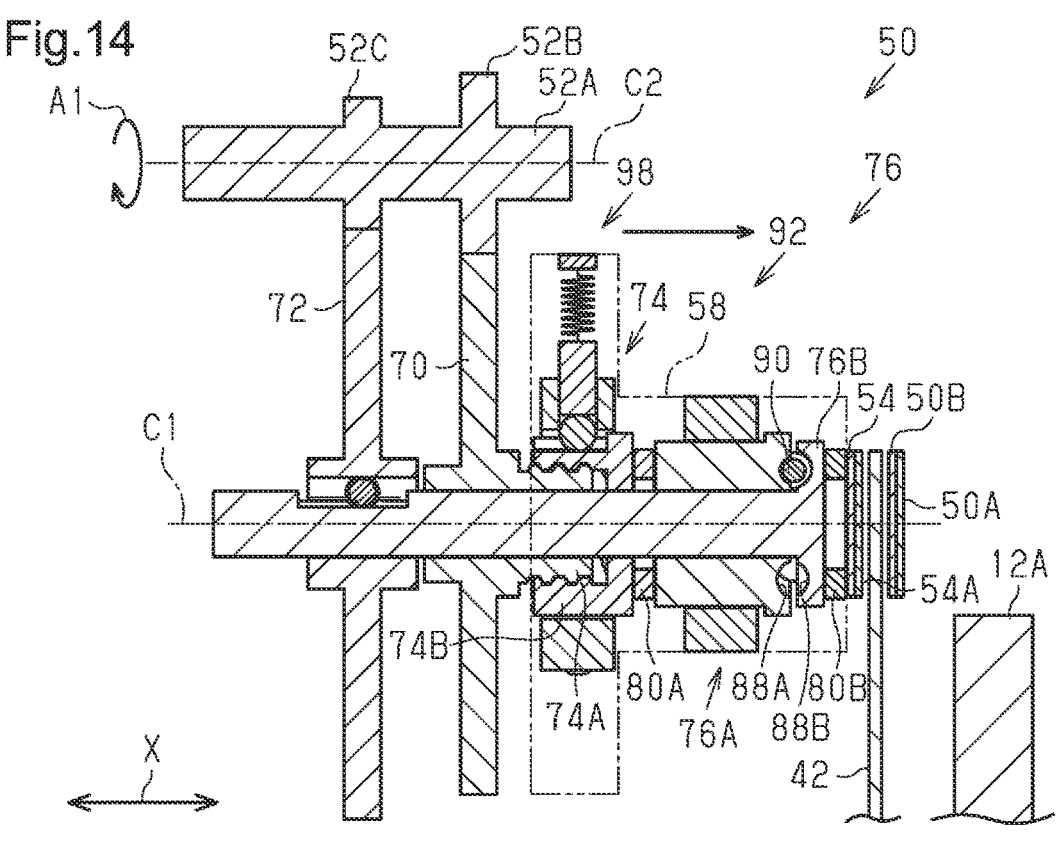
FIG. 14 is a cross-sectional view of the input body, the brake, the power converter, and the housing in a state where the brake is moved toward the rotational body from the state shown in FIG. 13.

FIG. 14 shows a state in which a force is transmitted to the first input rotational body 52B and the second input rotational body 52C so that the brake 54 is moved toward the rotational body 42 but not in contact with the rotational body 42. In a case where the rotational force in a first rotational direction A1 is transmitted from the electric actuator 62 to the first input rotational body 52B and the second input rotational body 52C in the state shown in FIG. 13, the first rotational body 70 and the second rotational body 72 are rotated. The first rotational body 70 either increases the speed of the rotational force input from the first input rotational body 52B at a predetermined speed increasing ratio or reduces the speed of the rotational force input from the first input rotational body 52B at the first speed reduction ratio. In an example, the second rotational body 72 reduces the speed of the rotational force input from the second input rotational body 52C at the second speed reduction ratio.

The force is transmitted through the first transmission path to the brake 54 until the brake 54 contacts the rotational body 42. The rotational force of the first rotational body 70 is transmitted to the first engagement portion 74A. The male thread of the first engagement portion 74A is engaged with the female thread of the second engagement portion 74B. This inputs the rotational force of the first engagement portion 74A to the second engagement portion 74B. In a case where the torque input to the second engagement portion 74B is less than the first torque, the first restriction mechanism 94 restricts rotation of the second engagement portion 74B. In a case where the torque input to the second engagement portion 74B is less than the second torque, the second restriction mechanism 96 permits movement of the second engagement portion 74B relative to the first engagement portion 74A in the direction X that is parallel to the first center axis C1. Therefore, in a case where the torque input to the second engagement portion 74B is less than the first torque and the second torque, the second engagement portion 74B is moved toward the third engagement portion 76A in the direction X that is parallel to the first center axis C1.

In a case where the second engagement portion 74B is moved toward the third engagement portion 76A in the direction X that is parallel to the first center axis C1, the second engagement portion 74B presses the third engagement portion 76A with the first support 80A to move the third engagement portion 76A toward the fourth engagement portion 76B in the direction X that is parallel to the first center axis C1. In a case where the third engagement portion 76A is moved toward the fourth engagement portion 76B in the direction X that is parallel to the first center axis C1, the fourth engagement portion 76B moves toward the brake 54 in the direction X that is parallel to the first center axis C1 while being rotated by the movement of the third rolling element 90 in the fifth groove 88A and the sixth groove 88B. In a case where the fourth engagement portion 76B is moved toward the brake 54 in the direction X that is parallel to the first center axis C1, the fourth engagement portion 76B presses the brake 54 with the second support 80B to move the brake 54 toward the rotational body 42 in the direction X that is parallel to the first center axis C1.

Figure 15:
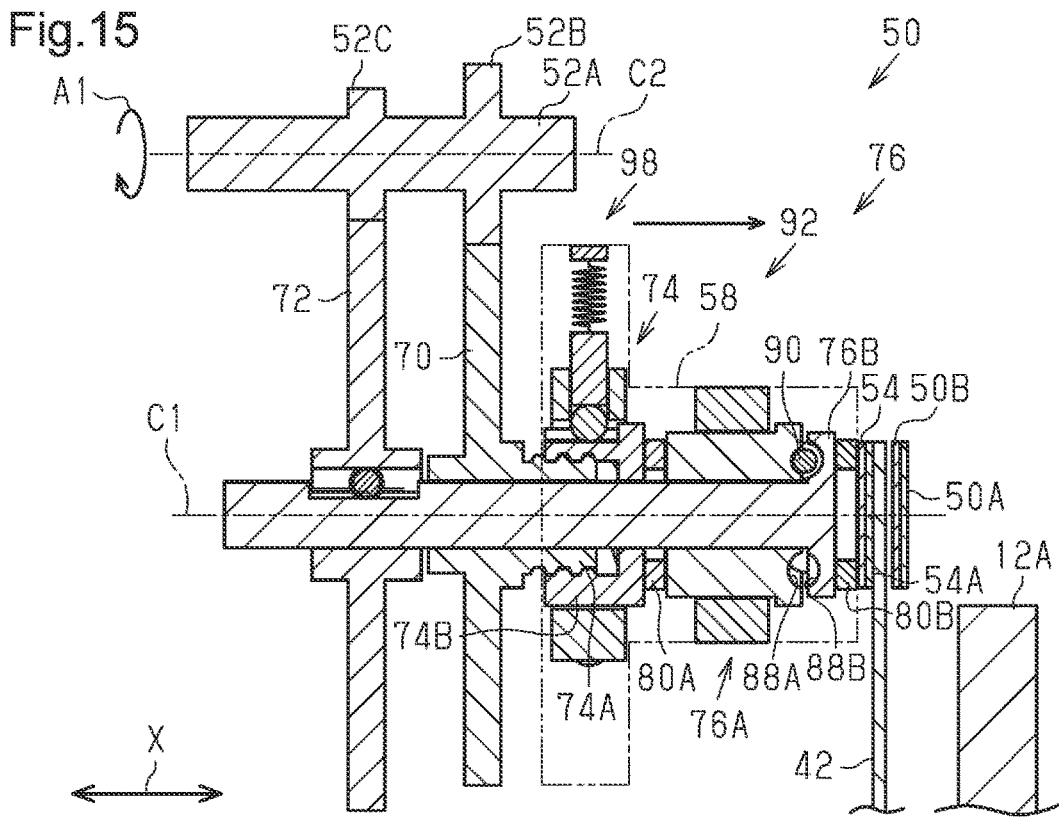
FIG. 15 is a cross-sectional view of the input body, the brake, the power converter, and the housing in a state where the brake is moved toward the rotational body from the state shown in FIG. 14 and the brake is in contact with the rotational body.

FIG. 15 shows a state in which the brake 54 is further moved toward the rotational body 42 from the state of FIG. 14 and the brake 54 is in contact with the rotational body 42. As the brake 54 comes into contact with the rotational body 42, the reaction force from the rotational body 42 acts on the brake 54. The reaction force applied by the rotational body 42 increases the torque transmitted through the first transmission path. As the torque transmitted through the first transmission path is increased so that the torque input to the second engagement portion 74B becomes greater than or equal to the second torque, the second restriction mechanism 96 restricts movement of the second engagement portion

74B relative to the first engagement portion 74A in the direction X that is parallel to the first center axis C1. As the torque transmitted through the first transmission path is increased so that the torque input to the second engagement portion 74B becomes greater than or equal to the first torque, the first restriction mechanism 94 permits rotation of the second engagement portion 74B. Therefore, as the torque input to the second engagement portion 74B becomes greater than or equal to the first torque and the second torque, the second engagement portion 74B rotates integrally with the first engagement portion 74A about the first shaft 68 and no longer moves in the direction X that is parallel to the first center axis C1.

In a state in which the brake 54 is in contact with the rotational body 42, the rotational force transmitted through the second transmission path to the second rotational body 72 moves the fourth engagement portion 76B toward the brake 54 in the direction X that is parallel to the first center axis C1 while rotating the fourth engagement portion 76B through the movement of the third rolling element 90 in the fifth groove 88A and the sixth groove 88B. The second ratio R2 resulting from the second transmission path is smaller than the first ratio R1 resulting from the first transmission path. This allows the brake 54 to produce a large braking force in a state in which the brake 54 is in contact with the rotational body 42.

Figure 16:
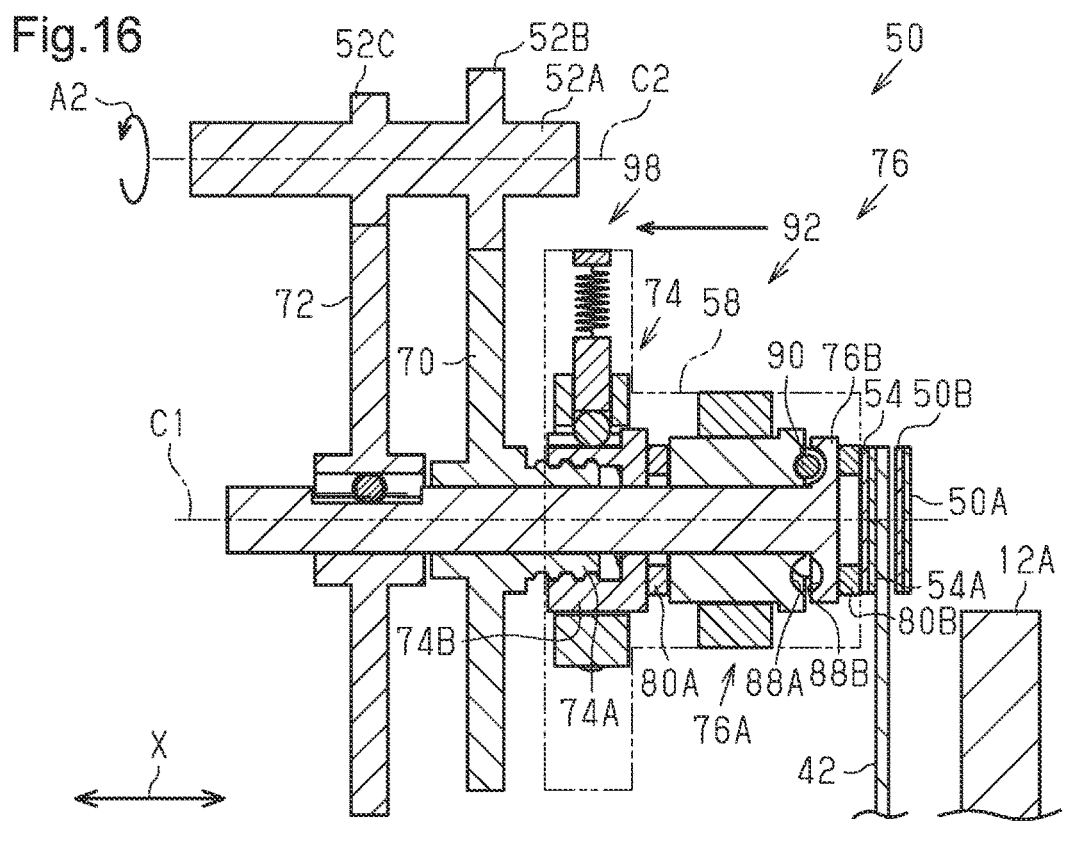
FIG. 16 is a cross-sectional view of the input body, the brake, the power converter, and the housing in a state where a force that moves the brake away from the rotational body is input to the brake shown in FIG. 15.

FIG. 16 shows a state in which a rotational force in a second rotational direction A2 is transmitted from the electric actuator 62 to the first input rotational body 52B and the second input rotational body 52C while the brake 54 is in contact with the rotational body 42. In FIG. 16, the first rotational body 70 and the second rotational body 72 are rotated in the direction opposite to that in the states shown in FIGS. 14 and 15. In a case where the brake 54 continues to be in contact with the rotational body 42 so that the torque input to the second engagement portion 74B remains to be the second torque or greater, the second restriction mechanism 96 continues to restrict movement of the second engagement portion 74B relative to the first engagement portion 74A in the direction X that is parallel to the first center axis C1. In a case where the brake 54 continues to be in contact with the rotational body 42 so that the torque input to the second engagement portion 74B is remains to be the first torque or greater, the first restriction mechanism 94 continues to permit rotation of the second engagement portion 74B relative to the housing 58. Therefore, until the torque input to the second engagement portion 74B becomes less than the first torque and the second torque, the rotational force transmitted through the second transmission path to the second rotational body 72 moves the brake 54 away from the rotational body 42 with the fourth engagement portion 76B in the direction X that is parallel to the first center axis C1.

Even in a case where the rotational force in the first rotational direction A1 is transmitted from the electric actuator 62 to the first input rotational body 52B and the second input rotational body 52C, the rotational force transmitted through the second transmission path to the second rotational body 72 moves the brake 54 away from the rotational body 42 with the fourth engagement portion 76B in the direction X that is parallel to the first center axis C1 until the torque input to the second engagement portion 74B becomes less than the first torque and the second torque.

Figure 17:
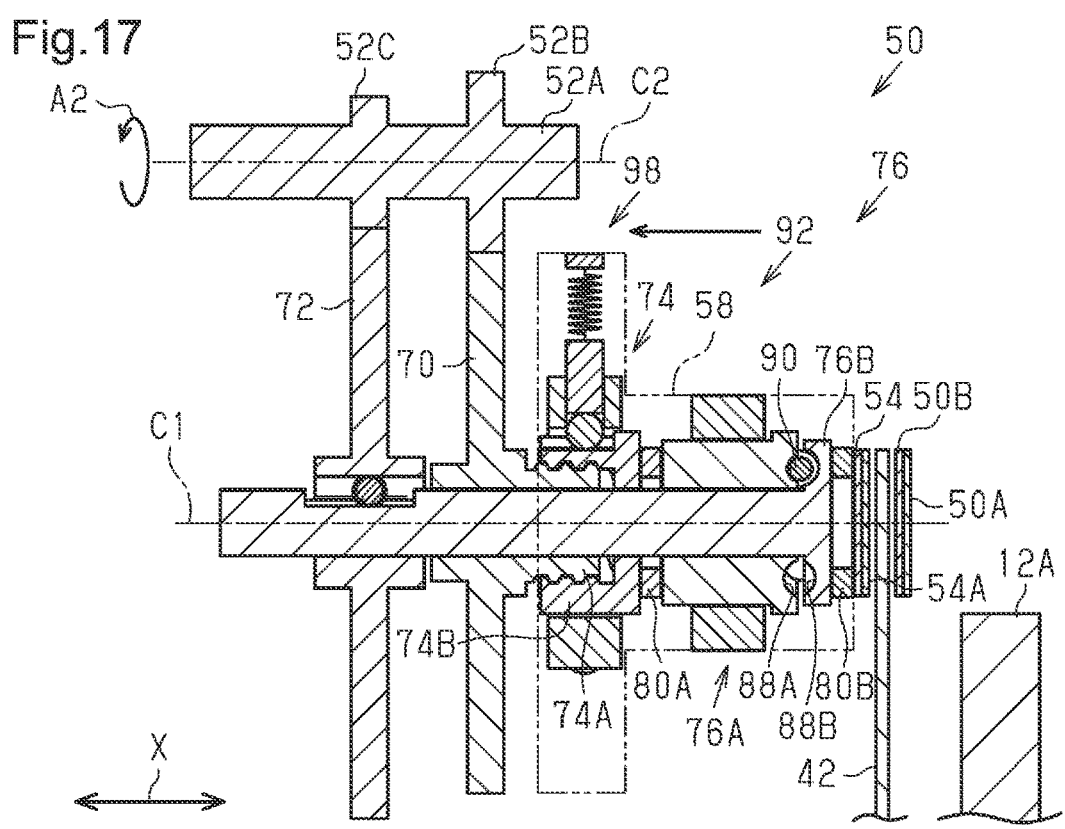
FIG. 17 is a cross-sectional view of the input body, the brake, the power converter, and the housing in a state where the brake shown in FIG. 16 is moved away from the rotational body.

FIG. 17 shows a state in which the brake 54 is further moved away from the rotational body 42 from the state of FIG. 15 and the brake 54 is no longer in contact with the rotational body 42. In a case where the brake 54 is separated from the rotational body 42, a reaction force from the rotational body 42 does not act on the brake 54. This reduces the torque input to the second engagement portion 74B. As the torque transmitted through the first transmission path is reduced so that the torque input to the second engagement portion 74B becomes less than the second torque, the second restriction mechanism 96 permits movement of the second engagement portion 74B relative to the first engagement portion 74A in the direction X that is parallel to the first center axis C1. As the torque transmitted through the first transmission path is reduced so that the torque input to the second engagement portion 74B becomes less than the first torque, the first restriction mechanism 94 restricts rotation of the second engagement portion 74B. Therefore, as the torque input to the second engagement portion 74B becomes less than the first torque and the second torque, the second engagement portion 74B uses the rotational force in the second rotational direction A2 input from the electric actuator 62 to the second input rotational body 52C to move the brake 54 away from the rotational body 42 in the direction X that is parallel to the first center axis C1.

The brake device 50 moves the brake 54 toward the rotational body 42 at the first ratio R1 until the brake 54 contacts the rotational body 42. This readily brakes the rotational body 42. As the brake 54 comes into contact with the rotational body 42, the brake device 50 moves the brake 54 toward the rotational body 42 at the second ratio R2 that is smaller than the first ratio R1. This allows the brake 54 to produce a large braking force in a state in which the brake 54 is in contact with the rotational body 42.

Second Embodiment

Figure 2:
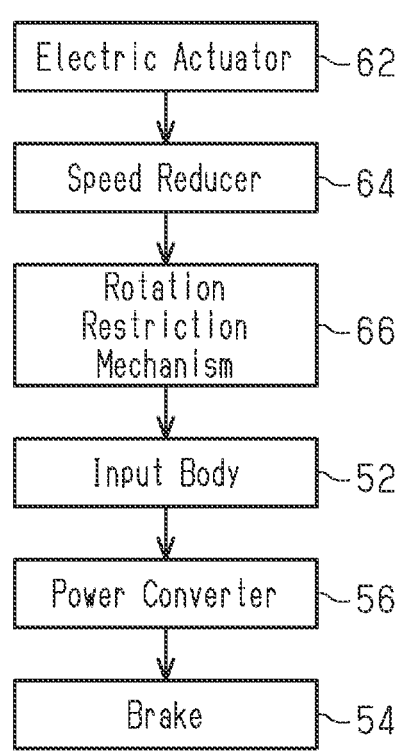
FIG. 2 is a block diagram illustrating a power transmission path in the human-powered vehicle brake device shown in FIG. 1.
Figure 3:
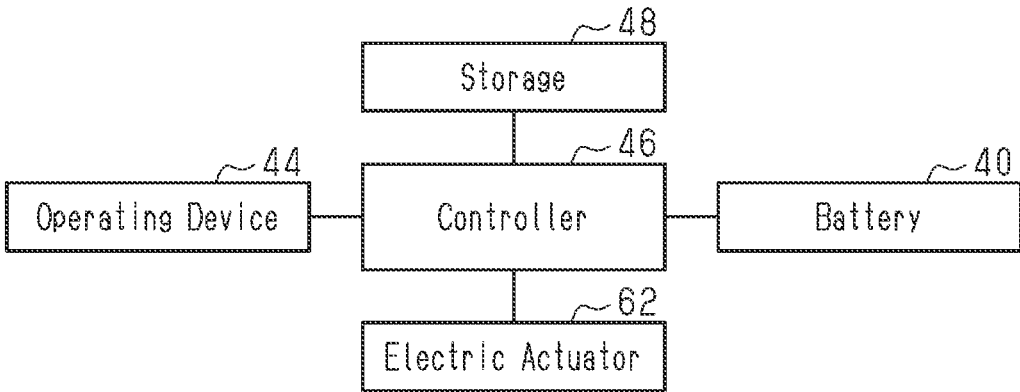
FIG. 3 is a block diagram illustrating the electrical configuration of the human-powered vehicle including the human-powered vehicle brake device shown in FIG. 1.
Figure 4:
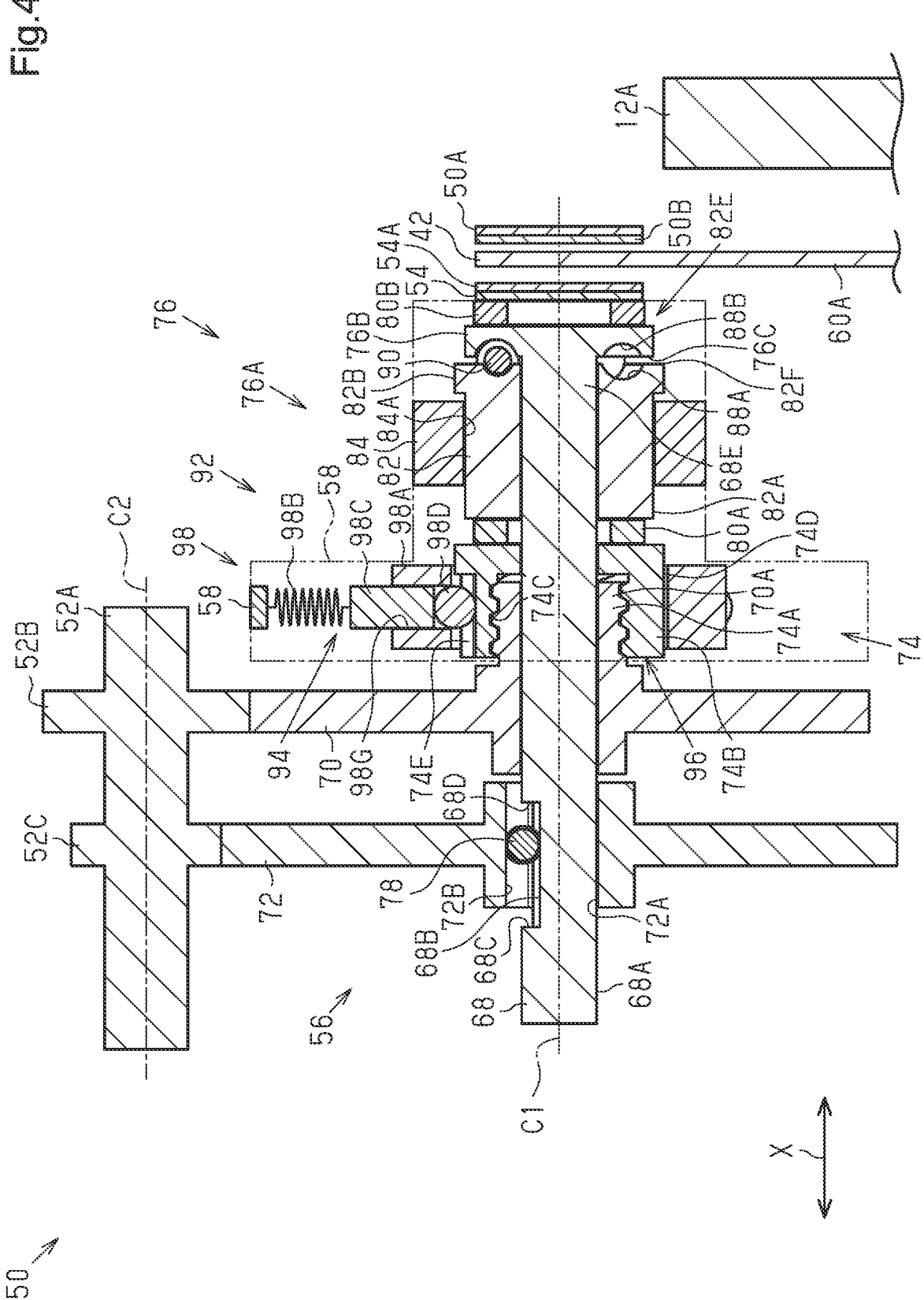
FIG. 4 is a cross-sectional view showing an input body, a brake, a power converter, and a housing of the human-powered vehicle brake device shown in FIG. 1.
Figure 5:
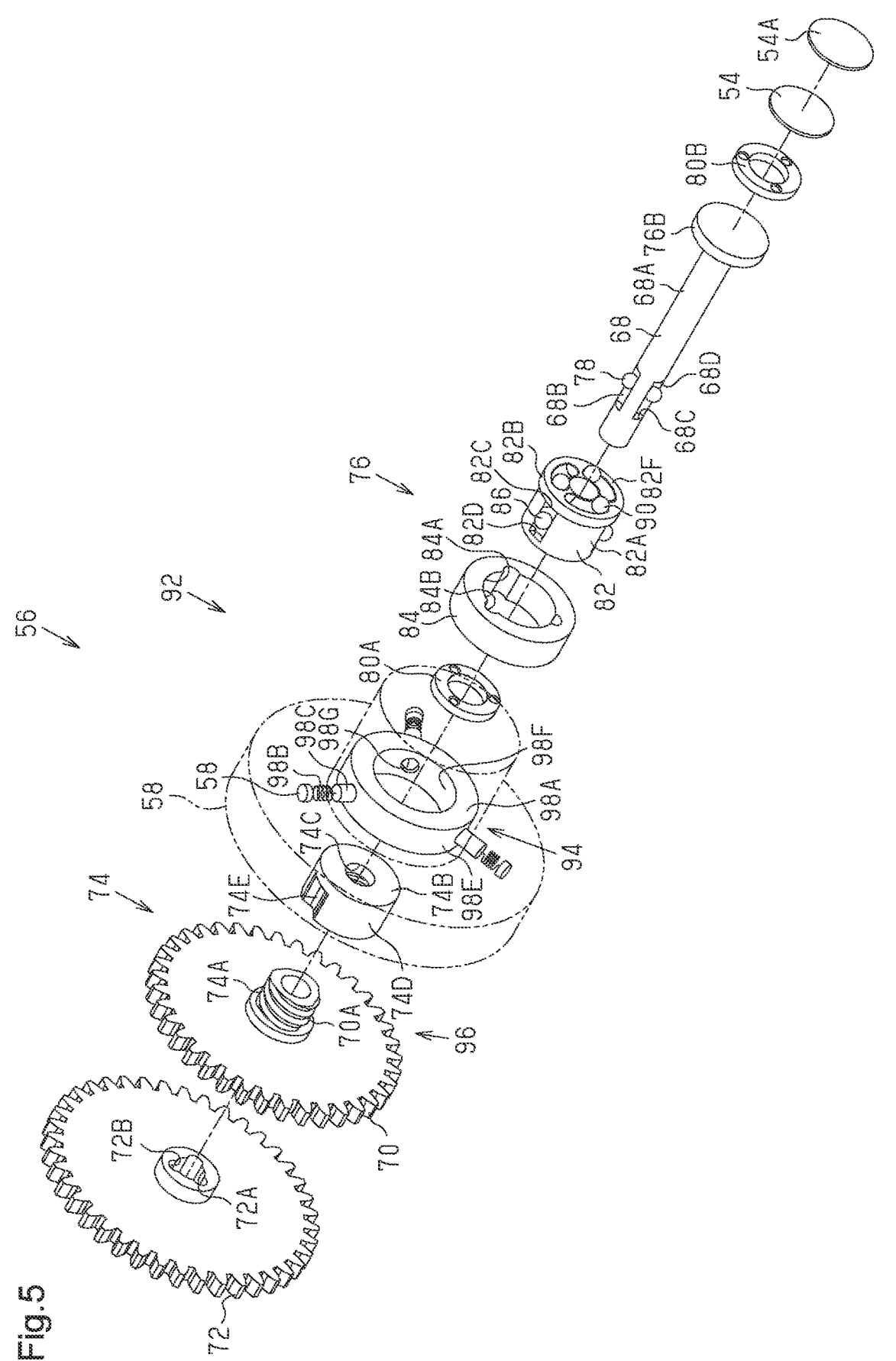
FIG. 5 is an exploded perspective view of the power converter shown in FIG. 4.
Figure 6:
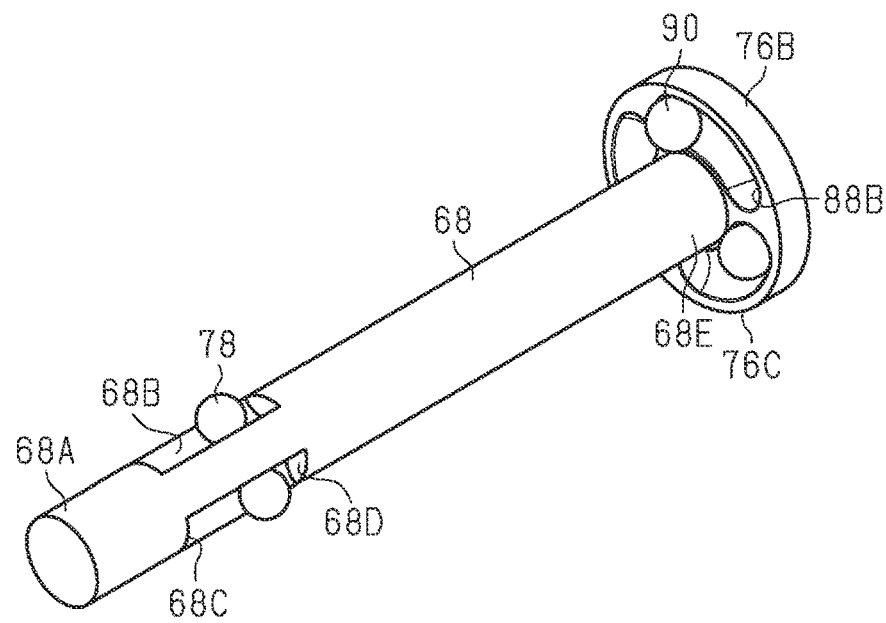
FIG. 6 is a perspective view of a first shaft, first rolling element, a third rolling element, and a fourth engagement portion shown in FIG. 5.
Figure 7:
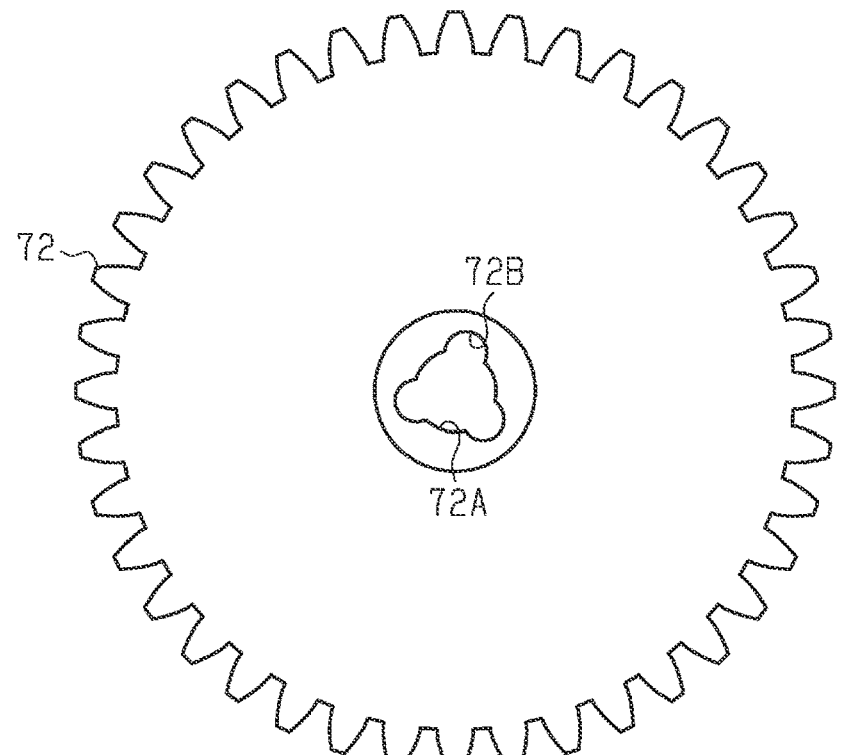
FIG. 7 is a front elevational view of a second rotational body shown in FIG. 5.
Figure 8:
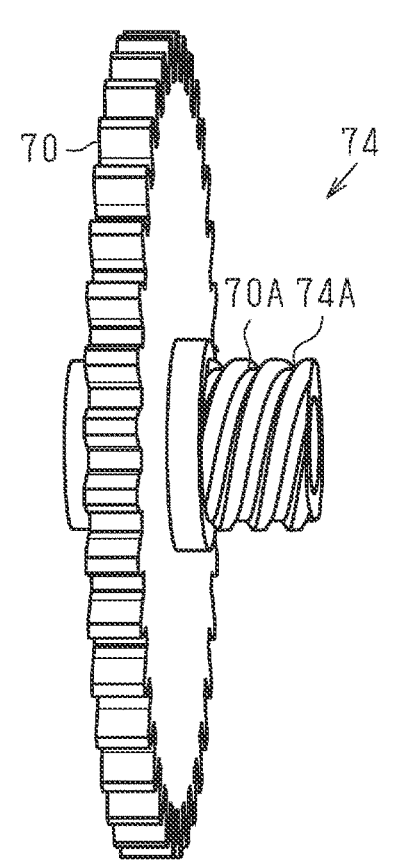
FIG. 8 is a perspective view of a first rotational body and a first converter shown in FIG. 5.
Figure 9:
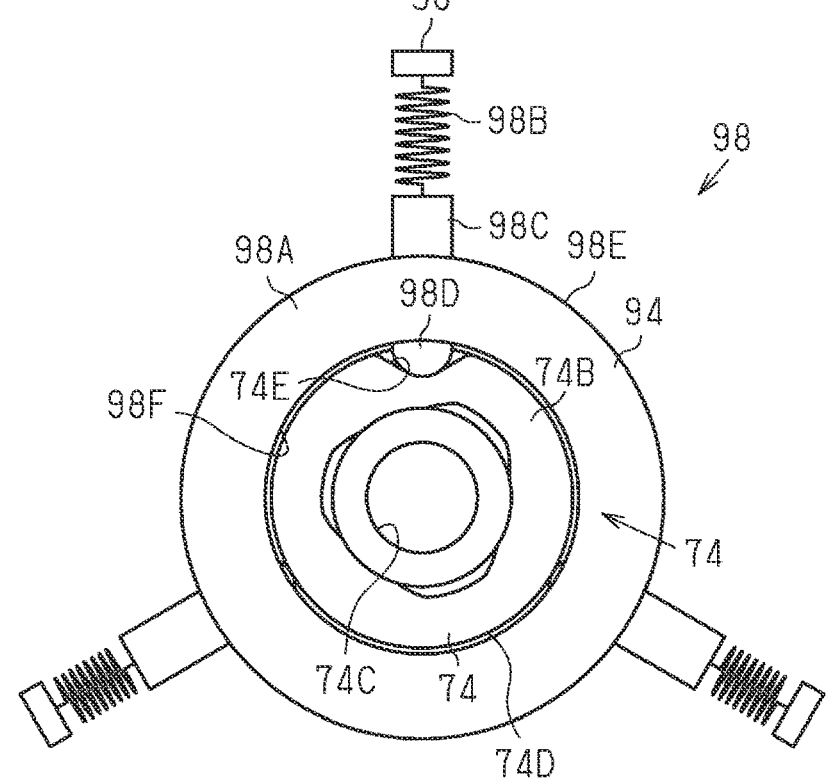
FIG. 9 is a front elevational view of a rotation restrictor and a second engagement portion shown in FIG. 5.
Figure 10:
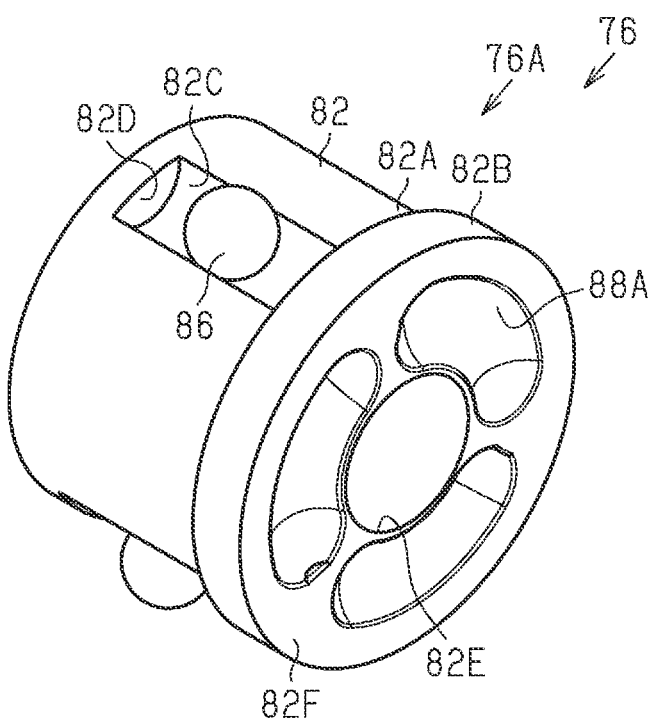
FIG. 10 is a perspective view of a first member, a third member, and a second rolling element of a third engagement portion shown in FIG. 5.
Figure 11:
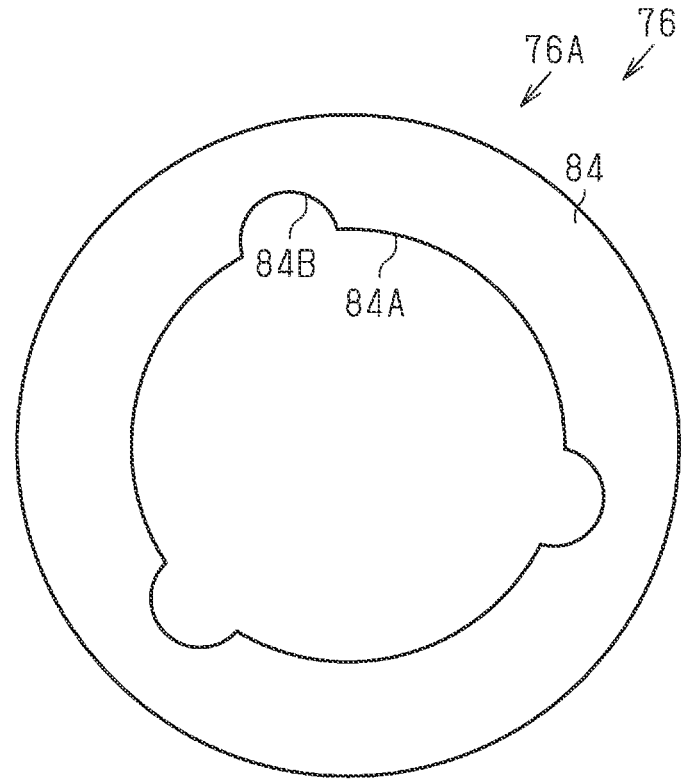
FIG. 11 is a front elevational view of a second member of the third engagement portion shown in FIG. 5.
Figure 12:
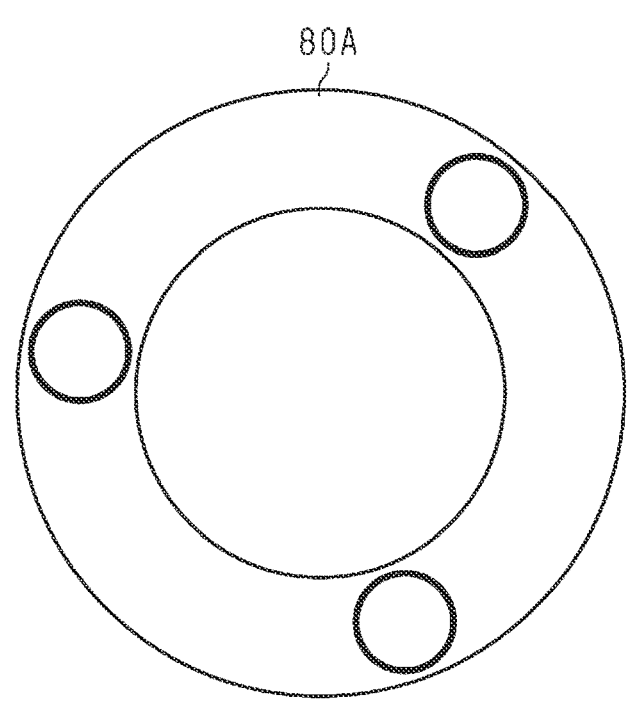
FIG. 12 is a front elevational view of a first support shown in FIG. 5.
Figure 18:
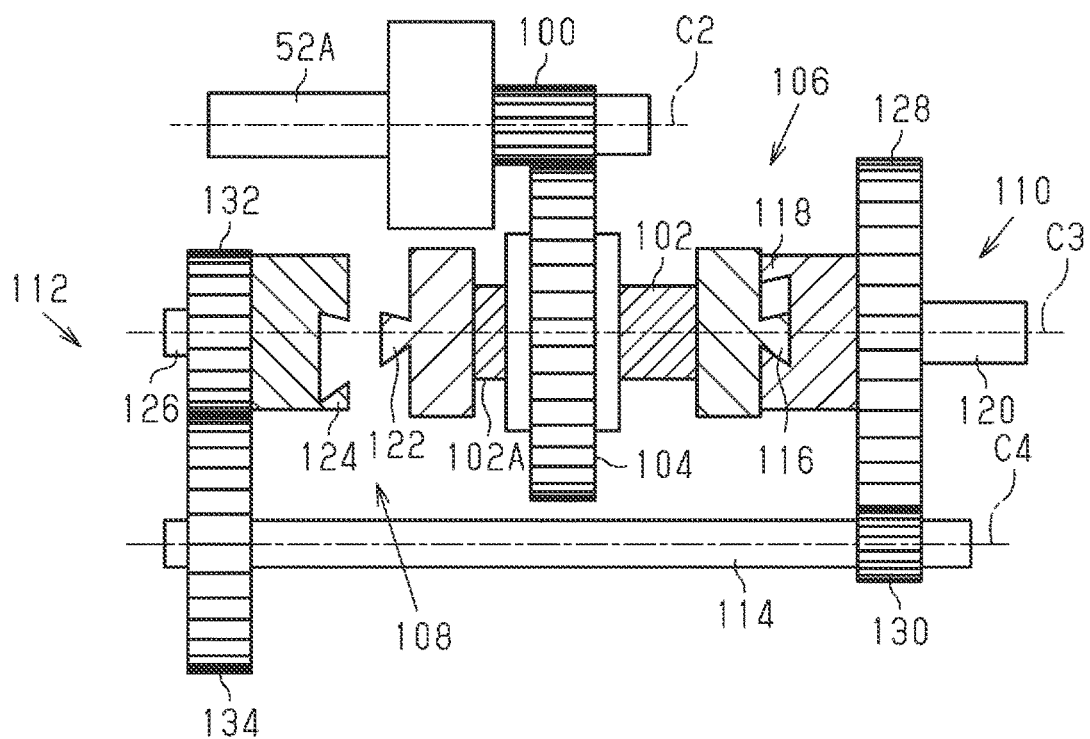
FIG. 18 is a cross-sectional view of a human-powered vehicle brake device in accordance with a second embodiment in a first state.
Figure 19:
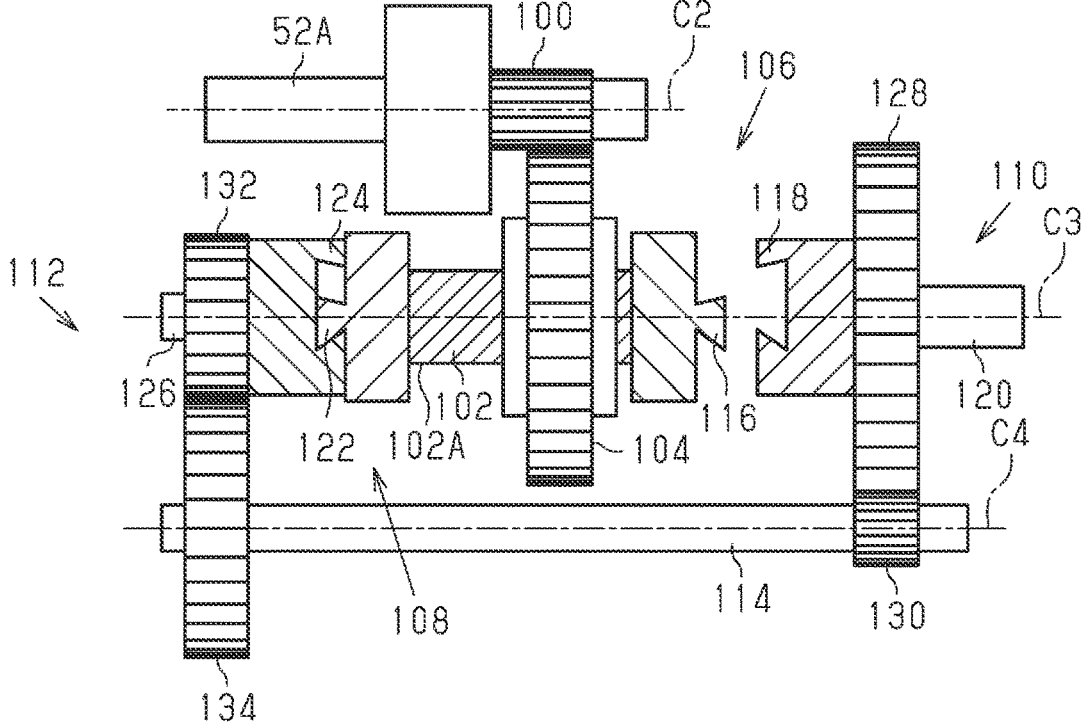
FIG. 19 is a cross-sectional view of the human-powered vehicle brake device shown in FIG. 18 in a second state.

A brake device 50 in accordance with a second embodiment will now be described with reference to FIGS. 2, 18, and 19. Same reference numerals are given to those components in the second embodiment that are the same as the corresponding components of the first embodiment. Such components will not be described in detail.

The power converter 56 in accordance with the present embodiment includes a second shaft 102, a third rotational body 104, a third converter 106, a fourth converter 108, a first transmission 110, a second transmission 112, and a third shaft 114, instead of the first shaft 68, the first rotational body 70, the second rotational body 72, the first converter 74, and the second converter 76 of the first embodiment.

The power converter 56 of the present embodiment further includes, for example, a conversion mechanism that converts a rotational motion to a linear motion. In the present embodiment, for example, the rotational force of the input body 52 is transmitted by the third converter 106 or the fourth converter 108 to the conversion mechanism that converts a rotational motion to a linear motion. In the present embodiment, the brake 54 is attached to, for example, the conversion mechanism. The brake 54 is moved toward the rotational body 42 with the linear motion converted from the rotational motion by the conversion mechanism. The conversion mechanism includes, for example, a rack-and-pinion or a ball screw. The conversion mechanism is provided on, for example, a first conversion shaft 120 of the third converter 106.

In the present embodiment, the second shaft 102, the third rotational body 104, the third converter 106, the fourth converter 108, the first transmission 110, the second transmission 112, and the third shaft 114 correspond to the transmission 92 configured to change the ratio R of the movement amount of the brake 54 to the output rotational speed of the input body 52. The second shaft 102, the third rotational body 104, the third converter 106, the fourth converter 108, the first transmission 110, the second transmission 112, and the third shaft 114 are configured to change the ratio R between the first ratio R1 and the second ratio R2 that differs from the first ratio R1.

In the present embodiment, a power transmission path extending through the third converter 106 corresponds to the first transmission path configured to set the ratio R to the first ratio R1. In the present embodiment, a power transmission path extending through the fourth converter 108 corresponds to the second transmission path configured to set the ratio R to the second ratio R2.

In the present embodiment, the input body 52 includes, for example, a third input rotational body 100 instead of the first input rotational body 52B and the second input rotational body 52C. In an example, the third input rotational body 100 is formed integrally with the input rotational shaft 52A. The third input rotational body 100 can be formed separately from the input rotational shaft 52A and attached to the input rotational shaft 52A in a manner restricting relative rotation. The third input rotational body 100 includes, for example, a gear.

In an example, the second shaft 102 has a third center axis C3 that is substantially parallel to the second center axis C2. The second shaft 102 includes, for example, a male thread. In an example, the male thread of the second shaft 102 is formed in an outer circumferential portion 102A of the second shaft 102. In an example, the third rotational body 104 is formed separately from the second shaft 102. The third rotational body 104 includes, for example, a female thread. In an example, the female thread is formed in an inner circumferential portion of the third rotational body 104. In an example, the third rotational body 104 is attached to a central portion of the second shaft 102. The male thread of the second shaft 102 and the female thread of the third rotational body 104 can form, for example, a ball screw.

The third rotational body 104 includes, for example, a gear. In an example, the gear of the third rotational body 104 is engaged with the gear of the third input rotational body 100. The rotational force of the third input rotational body 100 is transmitted to the third rotational body 104. In an example, the third rotational body 104 has a larger outer diameter than the third input rotational body 100. In an example, the third rotational body 104 is attached to the housing 58 in a manner immovable in an axial direction of the third center axis C3. In an example, the second shaft 102 is configured to be movable relative to the third rotational body 104 in the axial direction of the third center axis C3.

The third converter 106 includes, for example, a first key 116, a first keyway 118, and the first conversion shaft 120. The fourth converter 108 includes, for example, a second key 122, a second keyway 124, and a second conversion shaft 126. In an example, the first key 116 is provided on one end of the second shaft 102, and the second key 122 is provided on the other end of the second shaft 102.

In an example, the first conversion shaft 120 has a rotational center axis that substantially coincides with the third center axis C3. In an example, the second conversion shaft 126 has a rotational center axis that substantially coincides with the third center axis C3. The first conversion shaft 120 is arranged next to the one end of the second shaft 102 and aligned with the second shaft 102. The second conversion shaft 126 is arranged next to the other end of the second shaft 102 and aligned with the second shaft 102.

The first keyway 118 is provided on, for example, the first conversion shaft 120. In an example, the first keyway 118 is formed integrally with the first conversion shaft 120. In an example, the first keyway 118 is engageable with the first key 116.

The second keyway 124 is provided on, for example, the second conversion shaft 126. In an example, the second keyway 124 is formed integrally with the second conversion shaft 126. In an example, the second keyway 124 is engageable with the second key 122.

In an example, the third shaft 114 has a fourth center axis C4 that is substantially parallel to the third center axis C3. The first transmission 110 includes, for example, a fourth rotational body 128 and a fifth rotational body 130. The fourth rotational body 128 and the fifth rotational body 130 each include, for example, a gear. The fourth rotational body 128 is provided on the first conversion shaft 120. The fifth rotational body 130 is provided on the third shaft 114. In an example, the fourth rotational body 128 is engaged with the fifth rotational body 130. In an example, the fourth rotational body 128 has a larger outer diameter than the fifth rotational body 130.

The second transmission 112 includes, for example, a sixth rotational body 132 and a seventh rotational body 134. The sixth rotational body 132 and the seventh rotational body 134 each include, for example, a gear. The sixth rotational body 132 is provided on the second conversion shaft 126. The seventh rotational body 134 is provided on, for example, the third shaft 114. In an example, the sixth rotational body 132 is engaged with the seventh rotational body 134. In an example, the seventh rotational body 134 has a larger outer diameter than the sixth rotational body 132.

In an example in which the rotational force of the third rotational body 104 is transmitted to the second shaft 102, the male thread of the second shaft 102 and the female thread of the third rotational body 104 apply a force F1 to the second shaft 102 that acts toward the second conversion shaft 126.

The power converter 56 of the present embodiment further includes, for example, a biasing member configured to apply a force F2 to the second shaft 102 that acts toward the first keyway 118. In a case where the input body 52 is not rotated, the biasing member acts to engage the first key 116 of the second shaft 102 with the first keyway 118.

The first key 116 includes, for example, a first inclined surface inclined with respect to the third center axis C3. The first keyway 118 includes a second inclined surface inclined with respect to the third center axis C3. The first inclined surface and the second inclined surface are engaged with each other if the first key 116 is engaged with the first keyway 118 in a case where the first key 116 is rotated in the direction corresponding to the first rotational direction A1. In a case where the second shaft 102 rotates the first conversion shaft 120 in a state in which the first inclined surface is engaged with the second inclined surface, the first inclined surface and the second inclined surface apply a force F3A to the second shaft 102 that acts toward the first conversion shaft 120.

The first key 116 includes, for example, a third inclined surface inclined with respect to the third center axis C3. The first keyway 118 includes a fourth inclined surface inclined with respect to the third center axis C3. The third inclined surface and the fourth inclined surface are engaged with each other if the first key 116 is engaged with the first keyway 118 in a case where the first key 116 is rotated in the direction corresponding to the second rotational direction A2. In a case where the second shaft 102 rotates the first conversion shaft 120 in a state in which the third inclined surface is engaged with the fourth inclined surface, the third inclined surface and the fourth inclined surface apply a force F3B to the second shaft 102 that acts toward the first conversion shaft 120.

The second key 122 includes, for example, a fifth inclined surface inclined with respect to the third center axis C3. The second keyway 124 includes a sixth inclined surface inclined with respect to the third center axis C3. The fifth inclined surface and the sixth inclined surface are engaged with each other if the second key 122 is engaged with the second keyway 124 in a case where the second key 122 is rotated in the direction corresponding to the first rotational direction A1. In a case where the second shaft 102 rotates the second conversion shaft 126 in a state in which the fifth inclined surface is engaged with the sixth inclined surface, the fifth inclined surface and the sixth inclined surface apply a force F4A to the second shaft 102 that acts toward the second conversion shaft 126.

The second key 122 includes, for example, a seventh inclined surface inclined with respect to the third center axis C3. The second keyway 124 includes an eighth inclined surface inclined with respect to the third center axis C3. The seventh inclined surface and the eighth inclined surface are engaged with each other if the second key 122 is engaged with the second keyway 124 in a case where the second key 122 is rotated in the direction corresponding to the second rotational direction A2. In a case where the second shaft 102 rotates the second conversion shaft 126 in a state in which the seventh inclined surface is engaged with the sixth inclined surface, the fifth inclined surface and the sixth inclined surface apply the force F4A to the second shaft 102 that acts toward the second conversion shaft 126.

In the first transmission path, the rotational force input to the input body 52 is transmitted to the third input rotational body 100, the third rotational body 104, the second shaft 102, and the first conversion shaft 120 in this order. In the second transmission path, the rotational force input to the input body 52 is transmitted to the third input rotational body 100, the third rotational body 104, the second shaft 102, the second conversion shaft 126, the sixth rotational body 132, the seventh rotational body 134, the third shaft 114, the fifth rotational body 130, the fourth rotational body 128, and the first conversion shaft 120 in this order.

In an example in which a rotational force in the first rotational direction A1 is transmitted to the input body 52 in a state in which the first key 116 of the second shaft 102 is engaged with the first keyway 118, the second shaft 102 and the first key 116 are rotated integrally with the third rotational body 104. Since the first key 116 is engaged with the first keyway 118, the first keyway 118 and the first conversion shaft 120 are rotated integrally with the first key 116. The rotation of the first conversion shaft 120 moves the brake 54 toward the rotational body 42 with the conversion mechanism.

In an example, the sum of the force F2 and the force F3A is greater than the force F1 until the brake 54 contacts the rotational body 42. Thus, the first key 116 and the first keyway 118 remain engaged until the brake 54 contacts the rotational body 42.

As the brake 54 moves toward the rotational body 42 and the brake 54 comes into contact with the rotational body 42, a reaction force is applied from the rotational body 42 to the brake 54. The reaction force from the rotational body 42 acting on the brake 54 increases the torque transmitted through the first transmission path. The increase in the torque transmitted through the first transmission path increases the force F1. In a case where the force F1 becomes greater than the sum of the force F2 and the force F3A, the second shaft 102 starts to move toward the second conversion shaft 126. This disengages the first key 116 from the first keyway 118.

As the second shaft 102 moves toward the second conversion shaft 126 and the second key 122 engages the second keyway 124, the second shaft 102 and the second key 122 are rotated integrally with the second conversion shaft 126 and the sixth rotational body 132. The sixth rotational body 132 is engaged with the seventh rotational body 134. Thus, the rotation of the sixth rotational body 132 rotates the third shaft 114 and the fifth rotational body 130. The fifth rotational body 130 is engaged with the fourth rotational body 128 so as to rotate the fourth rotational body 128 and the first conversion shaft 120. The rotation of the first conversion shaft 120 moves the brake 54 toward the rotational body 42 with the conversion mechanism.

In an example in which a rotational force in the first rotational direction A1 is transmitted to the input body 52 in a state in which the second key 122 of the second shaft 102 is engaged with the second keyway 124 and the brake 54 is in contact with the rotational body 42, the sum of the force F4A and the force F1 is greater than the force F2. Thus, the second key 122 and the second keyway 124 remain engaged.

In an example in which a rotational force in the second rotational direction A2 is transmitted to the input body 52 in a state in which the second key 122 of the second shaft 102 is engaged with the second keyway 124 and the brake 54 is in contact with the rotational body 42, the sum of the force F4B and the force F1 is greater than the force F2. Thus, the second key 122 and the second keyway 124 remain engaged. In a case where a rotational force in the second rotational direction A2 is transmitted to the input body 52 in a state in which the second key 122 of the second shaft 102 is engaged with the second keyway 124 and the brake 54 is in contact with the rotational body 42, the rotation of the first conversion shaft 120 moves the brake 54 away from the rotational body 42 with the conversion mechanism.

As the brake 54 moves away from the rotational body 42 and the brake 54 separates from the rotational body 42, a reaction force from the rotational body 42 no longer acts on the brake 54. This reduces the torque transmitted through the second transmission path. The decrease in the torque transmitted through the second transmission path reduces the force F2. In a case where the sum of the force F4B and the force F1 becomes less than the force F2, the second shaft 102 starts to move toward the first conversion shaft 120. This disengages the second key 122 from the second keyway 124.

As the second shaft 102 moves toward the first conversion shaft 120 and the first key 116 engages the first keyway 118, the second shaft 102 and the first key 116 are rotated integrally with the first conversion shaft 120. The rotation of the first conversion shaft 120 moves the brake 54 away from the rotational body 42 with the conversion mechanism.

In a case where a rotational force in the second rotational direction A2 is transmitted to the input body 52 in a state in which the first key 116 is engaged with the first keyway 118 and the brake 54 is separated from the rotational body 42, the sum of the force F3B and the force F2 is greater than the force F1. Thus, the first key 116 and the first keyway 118 remain engaged.

The brake device 50 of the second embodiment moves the brake 54 toward the rotational body 42 at the first ratio R1 until the brake 54 contacts the rotational body 42. This readily brakes the rotational body 42 and allows the brake 54 to produce a large braking force in a state in which the brake 54 is in contact with the rotational body 42.

Modifications

The description related with the above embodiments exemplifies, without any intention to limit, applicable forms of a human-powered vehicle brake device according to the present disclosure. In addition to the embodiments described above, the human-powered vehicle brake device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments and such components will not be described in detail.

The electric actuator 62 can be omitted. In a case where the electric actuator 62 is omitted, the input body 52 can be configured to transmit a human driving force. In an example, the human driving force is transmitted to the speed reducer 64, the rotation restriction mechanism 66, the input body 52, the power converter 56, and the brake 54 in this order. The operating device 44 is connected to the input body 52 by, for example, a cable. In an example, the input body 52 is configured to be rotated in the first rotational direction A1 in a case where operation of the operating device 44 moves the cable in a first direction. In an example, the input body 52 is configured to be rotated in the second rotational direction A2 in a case where the operation of the operating device 44 is canceled such that the cable is moved in a second direction.

The first input rotational body 52B and the first rotational body 70 can include pulleys and a belt instead of gears. The second input rotational body 52C and the second rotational body 72 can include pulleys and a belt instead of gears. The third input rotational body 100 and the third rotational body 104 can include pulleys and a belt instead of gears. The fourth rotational body 128 and the fifth rotational body 130 can include pulleys and a belt instead of gears. The sixth rotational body 132 and the seventh rotational body 134 can include pulleys and a belt instead of gears.

The first input rotational body 52B and the first rotational body 70 can include sprockets and a chain instead of gears. The second input rotational body 52C and the second rotational body 72 can include sprockets and a chain instead of gears. The third input rotational body 100 and the third rotational body 104 can include sprockets and a chain instead of gears. The fourth rotational body 128 and the fifth rotational body 130 can include sprockets and a chain instead of gears. The sixth rotational body 132 and the seventh rotational body 134 can include sprockets and a chain instead of gears.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A brake device for a human-powered vehicle, the brake device comprising:
   an input body to which a driving force is input;
   a brake configured to contact a rotational body of the human-powered vehicle;

a power converter configured to convert a rotational force of the input body to a force that moves the brake toward the rotational body; and a housing, the power converter including a transmission configured to change a ratio of a movement amount of the brake to an output rotational speed of the input body, the transmission being configured to change the ratio between a first ratio and a second ratio that differs from the first ratio, the power converter including a first shaft, a first converter, and a second converter, the first shaft having has a first center axis and being rotatable relative to the housing, the first converter being provided on the first shaft and configured to convert rotational motion to linear motion, and the second converter being provided on the first shaft and configured to convert rotational motion to linear motion.

2. The brake device according to claim 1, wherein the transmission is configured to set the ratio to the first ratio in a case where the brake is moved toward the rotational body until the brake contacts the rotational body and set the ratio to the second ratio as the brake comes into contact with the rotational body.

3. The brake device according to claim 1, wherein the transmission is configured to change the ratio from the first ratio to the second ratio in accordance with a reaction force produced as the brake comes into contact with the rotational body in a case where the brake is moved toward the rotational body.

4. The brake device according to claim 1, wherein the transmission is configured to set the ratio to the second ratio in a state in which the brake is in contact with the rotational body, and the transmission is configured to set the ratio to the first ratio as the brake separates from the rotational body in a case where the brake is moved away from the rotational body.

5. The brake device according to claim 1, wherein the transmission is configured to maintain the ratio at the second ratio with a reaction force applied to the brake by the rotational body in a case where the brake is moved away from the rotational body and the brake is in contact with the rotational body.

6. The brake device according to claim 1, wherein the first ratio is greater than the second ratio.

7. The brake device according to claim 1, wherein the transmission is configured to transmit a rotational force of the input body to the brake through one of a first transmission path configured to set the ratio to the first ratio and a second transmission path configured to set the ratio to the second ratio.

8. The brake device according to claim 1, further comprising:

an electric actuator configured to transmit the driving force to the input body.

9. The brake device according to claim 8, further comprising:

a speed reducer provided between the electric actuator and the input body.

10. The brake device according to claim 8, further comprising:

a rotation restriction mechanism provided between the electric actuator and the input body to restrict rotation of the input body in a case where output torque of the electric actuator is greater than or equal to a third torque.

11. The brake device according to claim 1, further comprising:

a disc brake including a disc rotor, wherein the rotational body includes the disc rotor.

12. A brake device for a human-powered vehicle, the brake device comprising:

an input body to which a driving force is input;

a brake configured to contact a rotational body of the human-powered vehicle; and a power converter configured to convert a rotational force of the input body to a force that moves the brake toward the rotational body, the power converter including a transmission configured to change a ratio of a movement amount of the brake to an output rotational speed of the input body, the transmission being configured to change the ratio between a first ratio and a second ratio that differs from the first ratio, the transmission being configured to transmit the rotational force of the input body to the brake through one of a first transmission path configured to set the ratio to the first ratio and a second transmission path configured to set the ratio to the second ratio, the input body including an input rotational shaft, a first input rotational body provided on the input rotational shaft, and a second input rotational body provided on the input rotational shaft and having an outer diameter that differs from that of the first input rotational body, the first input rotational body being configured to transmit a rotational force to the first transmission path, and the second input rotational body being configured to transmit a rotational force to the second transmission path.

13. The brake device according to claim 12, further comprising:

a housing, wherein:

the power converter includes a first shaft that has a first center axis and that is rotatable relative to the housing, a first rotational body that is provided on the first shaft and engaged with the first input rotational body, a second rotational body that is provided on the first shaft and engaged with the second input rotational body, a first converter that is provided on the first shaft and that converts rotational motion to linear motion, and a second converter that is provided on the first shaft and that converts rotational motion to linear motion;

the first shaft is configured to be movable relative to the first rotational body and the second rotational body in a direction parallel to the first center axis; and the brake is provided on an end of the first shaft in the direction parallel to the first center axis.

14. The brake device according to claim 13, wherein:

the first converter includes a first engagement portion and a second engagement portion;

the first engagement portion is provided on the first rotational body at a portion that differs from a portion engaged with the first input rotational body;

the second engagement portion is provided on the first shaft in a manner movable relative to the first shaft in the direction parallel to the first center axis and engaged with the first engagement portion;

one of the first engagement portion and the second engagement portion includes a female thread; and the other one of the first engagement portion and the second engagement portion includes a male thread.

15. The brake device according to claim 14, wherein:

the first engagement portion includes the male thread, and the second engagement portion includes the female thread.

16. The brake device according to claim 14, wherein the transmission includes a first restriction mechanism configured to restrict rotation of the second engagement portion relative to the housing, and a second restriction mechanism configured to restrict movement of the second engagement portion relative to the first engagement portion in the direction parallel to the first center axis.

17. The brake device according to claim 16, wherein:

the first restriction mechanism is configured to permit rotation of the second engagement portion relative to the housing in a case where a torque input to the second engagement portion is greater than or equal to a first torque;

the first restriction mechanism is configured to restrict rotation of the second engagement portion relative to the housing in a case where the torque input to the second engagement portion is less than the first torque;

the second restriction mechanism is configured to restrict movement of the second engagement portion relative to the first engagement portion in the direction parallel to the first center axis in a case where the torque input to the second engagement portion is greater than or equal to a second torque; and the second restriction mechanism is configured to permit movement of the second engagement portion relative to the first engagement portion in the direction parallel to the first center axis in a case where the torque input to the second engagement portion is less than the second torque.

18. The brake device according to claim 14, wherein:

the second converter includes a third engagement portion provided on the first shaft in a manner nonrotatable relative to the housing, and a fourth engagement portion provided on the first shaft;

the third engagement portion is configured to be moved relative to the first shaft integrally with the second engagement portion in the direction parallel to the first center axis; and the fourth engagement portion is configured to be moved relative to the first shaft and the second engagement portion in the direction parallel to the first center axis.

19. The brake device according to claim 18, wherein the second rotational body, the first rotational body, the second engagement portion, the third engagement portion, the fourth engagement portion, and the brake are provided on the first shaft in order of the second rotational body, the first rotational body, the second engagement portion, the third engagement portion, the fourth engagement portion, and the brake in the direction parallel to the first center axis.

20. A brake device for a human-powered vehicle, the brake device comprising:

an input body to which a driving force is input;

a brake configured to contact a rotational body of the human-powered vehicle;

a power converter configured to convert a force of the input body to a force that moves the brake toward the rotational body; and a housing, the power converter including a transmission configured to change a ratio of a movement amount of the brake to an output amount of the input body, and the transmission being configured to set the ratio to a first ratio in a case where the brake is moved toward the rotational body until the brake contacts the rotational body, and the transmission being configured to set the ratio to a second ratio that differs from the first ratio as the brake comes into contact with the rotational body, the transmission being configured to change the ratio between a first ratio and a second ratio that differs from the first ratio, the power converter including a first shaft, a first converter, and a second converter, the first shaft having has a first center axis and being rotatable relative to the housing, the first converter being provided on the first shaft and configured to convert rotational motion to linear motion, and the second converter being provided on the first shaft and configured to convert rotational motion to linear motion.

21. A brake device for a human-powered vehicle, the brake device comprising:

an input body to which a driving force is input;

a brake configured to contact a rotational body of the human-powered vehicle; and a power converter configured to convert a force of the input body to a force that moves the brake toward the rotational body, the power converter including a transmission configured to change a ratio of a movement amount of the brake to an output amount of the input body, the transmission being configured to set the ratio to a first ratio in a case where the brake is moved toward the rotational body until the brake contacts the rotational body, and the transmission being configured to set the ratio to a second ratio that differs from the first ratio as the brake comes into contact with the rotational body, the transmission being configured to transmit a rotational force of the input body to the brake through one of a first transmission path configured to set the ratio to the first ratio and a second transmission path configured to set the ratio to the second ratio, the input body including an input rotational shaft, a first input rotational body provided on the input rotational shaft, and a second input rotational body provided on the input rotational shaft and having an outer diameter that differs from that of the first input rotational body, the first input rotational body being configured to transmit a rotational force to the first transmission path, the second input rotational body being configured to transmit a rotational force to the second transmission path.

* * * * *